(12) United States Patent
Wen et al.

(10) Patent No.: US 7,366,371 B1
(45) Date of Patent: Apr. 29, 2008

(54) COMPACT OPTICAL MULTIPLEXER AND DEMULTIPLEXER

(75) Inventors: Zhenli Wen, Shanghai (CN); Kevin Dapeng Zhang, Fremont, CA (US); Dongsheng Han, Zhuhai (CN); Fahua Lan, Pudong Shanghai (CN)

(73) Assignee: Finisar Corporation, Sunnyvale, CA (US)

( * ) Notice: Subject to any disclaimer, the term of this patent is extended or adjusted under 35 U.S.C. 154(b) by 0 days.

(21) Appl. No.: 11/739,422

(22) Filed: Apr. 24, 2007

Related U.S. Application Data

(60) Provisional application No. 60/866,729, filed on Nov. 21, 2006.

(51) Int. Cl.
*G02B 6/28* (2006.01)

(52) U.S. Cl. ............................ 385/24; 385/15; 385/31; 385/33

(58) Field of Classification Search .................. 385/15, 385/24, 31, 33
See application file for complete search history.

(56) References Cited

U.S. PATENT DOCUMENTS

| | | | |
|---|---|---|---|
| 5,786,915 A | 7/1998 | Scobey | |
| 6,198,864 B1* | 3/2001 | Lemoff et al. | 385/47 |
| 6,652,161 B2* | 11/2003 | Grann et al. | 385/93 |
| 2002/0154857 A1 | 10/2002 | Goodman et al. | |
| 2005/0069013 A1 | 3/2005 | Bhandarkar et al. | |

\* cited by examiner

*Primary Examiner*—Jennifer Doan
(74) *Attorney, Agent, or Firm*—North Weber & Baugh LLP

(57) ABSTRACT

Spatially-efficient optical multiplexers and optical demultiplexers include elements interrelating along orthogonal axes. A transmission block of extreme thinness has highly reflective coatings on opposed parallel surfaces. Lasers of multiplexer are on one side of transmission block with transmission axes perpendicular to transmission block surface. An associated multiplexed signal transmitting port on opposite side of transmission block has receiving axis parallel to transmission block surface on that side. Detectors of demultiplexer are on one side of transmission block with reception axes perpendicular to transmission block surface. An associated multiplexed signal receiving port on opposite side of transmission block has receiving axis parallel to transmission block surface on that side. A unitary structure performs both optical multiplexer functions and optical demultiplexer function with a single thin transmission block. Related optical signal processing methods are included.

42 Claims, 10 Drawing Sheets

US 7,366,371 B1

COMPACT OPTICAL MULTIPLEXER AND DEMULTIPLEXER

CROSS REFERENCE TO RELATED PATENT APPLICATIONS

This application claims priority to U.S. Provisional Application Ser. No. 60/866,729, entitled "Multiplexer and Demultiplexer Structure for High-Speed Optical Transceivers," filed Nov. 21, 2006, which application is incorporated herein by reference in its entirety.

BACKGROUND

A. Technical Field

The present invention relates generally to the processing of optical signals, and more particularly, to the multiplexing and the demultiplexing of optical signals.

B. Background of the Invention

An optical multiplexer merges into mutual optical alignment as a single multiplexed signal a plurality of optical signals that are each at a different optical wavelength. For example, optical signals produced at different optical wavelengths by a corresponding number of distinct lasers may be combined by an optical multiplexer into a multiplexed transmitted signal that can then be retransmitted from a single multiplexed signal transmitting port. In an optical system, therefore, an optical multiplexer is the interconnecting link between a plurality of optical fibers bearing a corresponding plurality of transmitted signals and a single optical fiber on which that plurality of signals is able to be communicated in the form of a multiplexed transmission signal.

An optical demultiplexer reverses this process, separating a multiplexed signal that includes a plurality of signals at distinct wavelengths into that corresponding plurality of constituent signals. Thus, a multiplexed received signal from a single signal receiving port can be converted by an optical demultiplexer into the separate received signals at respective individual wavelengths that are included in the original multiplexed received signal. In an optical system, therefore, an optical demultiplexer is the interconnecting link between a single optical fiber on which a multiplexed received signal is being communicated and a plurality of optical fibers that each bears an individual of the received signals that had been included in that original multiplexed received signal.

SUMMARY OF THE INVENTION

The present invention includes teachings directed toward the design and construction of a spatially-efficient optical multiplexer. The present invention also pertains to the design and construction of a spatially-efficient optical demultiplexer.

In another aspect, the present invention provides a unitary structure that is capable of performing both, the function associated with an optical multiplexer, and the function associated with an optical demultiplexer. Such a structure, an optical multiplexer and demultiplexer, is advantageous in reducing the overall size and cost of components in optical systems.

The present invention also encompasses methods for processing plural optical signals at a corresponding plurality of distinct optical wavelengths. In particular, the teachings of the present invention relate to the consolidation of such plural optical signals into multiplexed signals, and to the separation of multiplexed signals into the constituent plural optical signals thereof.

Certain features and advantages of the present invention have been generally described in this summary section; however, additional features, advantages, and embodiments are presented herein or will be apparent to one of ordinary skill in the art in view of the drawings, specification, and claims hereof. Accordingly, it should be understood that the scope of the invention shall not be limited by the particular embodiments disclosed in this summary section.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that doing so is not to be construed as evidencing any intention whatsoever to limit the scope of the invention to those particular embodiments.

DETAILED DESCRIPTION OF THE PREFERRED EMBODIMENTS

In the following description, for purpose of explanation, specific details are set forth in order to provide an understanding of the invention. It will be apparent, however, to one skilled in the art that the invention may be practiced without these details. One skilled in the art will recognize that embodiments of the present invention, some of which are described below, may be incorporated into a number of different optical components, devices, and systems. Structures and devices shown in block diagram are illustrative of exemplary embodiments of the invention and are meant to avoid obscuring the invention. Furthermore, connections between components within the figures are not intended to be limited to direct connections. Rather, connections between these components may be modified, reconfigured, or otherwise changed, including by the addition of intermediary components.

Reference in the specification to "one embodiment" or "an embodiment" means that a particular feature, structure, characteristic, or function described in connection with the embodiment is included in at least one embodiment of the invention. The appearances of the phrase "in one embodiment" in various places in the specification are not necessarily all referring to the same embodiment.

Figure 1:
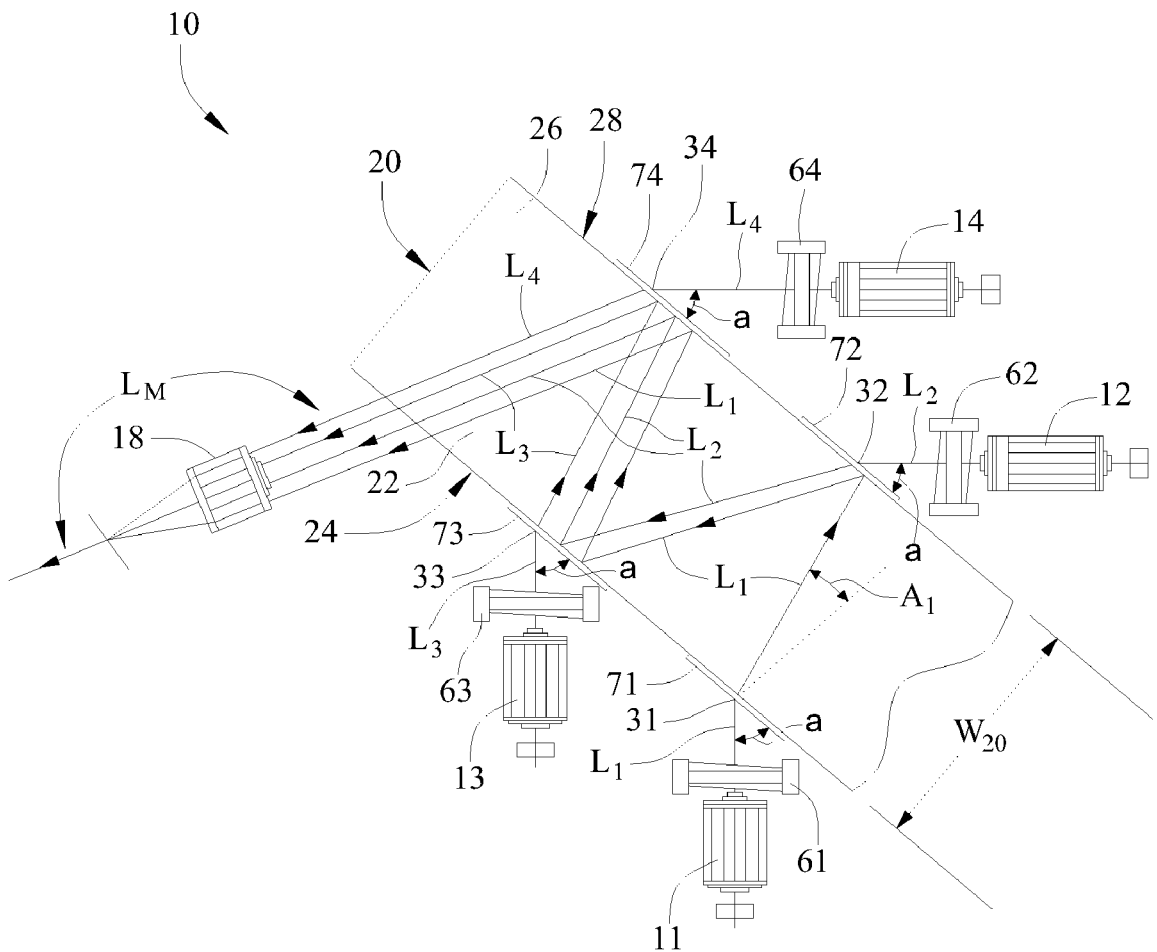
FIG. 1 is a diagram illustrating the interactions among typical elements of a known optical multiplexer.

FIG. 1 depicts an example of a known optical multiplexer 10. Multiplexer 10 includes a first laser 11, a second laser 12, a third laser 13, and a fourth laser 14 that each produce transmitted signals at respective distinct wavelengths. Thus, first laser 11 produces a first transmitted signal $L_1$ at a first transmission wavelength $\lambda_1$, while second laser 12 produces a second transmitted signal $L_2$ at a second transmission wavelength $\lambda_2$. Third laser 13 produces a third transmitted signal $L_3$ at a third transmission wavelength $\lambda_3$, and fourth laser 14 produces a fourth transmitted signal $L_4$ at a fourth transmission wavelength $\lambda_4$. It is the function of multiplexer 10 to merge transmitted signals $L_1$, $L_2$, $L_3$, and $L_4$ into a single multiplexed transmitted signal $L_M$ that can be presented to the input side of a multiplexed signal transmitting port 18 for retransmission.

Toward that end, positioned among lasers 11, 12, 13, and 14 and multiplexed signal transmitting port 18 is an optical signal transmission block 20. Transmission block 20 has on a first side 22 thereof a planar first surface 24 and on an opposed second side 26 thereof a planar second surface 28 that is parallel to first surface 24. As measured between first surface 24 and second surface 28, transmission block 20 has a width $W_{20}$.

First laser 11 and third laser 13 are disposed on first side 22 of transmission block 20 with the optical transmission axis of each directed toward first surface 24 at an angle of incidence $\alpha$. Second laser 14 and fourth laser 14 are disposed on second side 26 of transmission block 20 with the optical transmission axis of each directed at second surface 28 at an equal angle of incidence $\alpha$. Multiplexed signal transmitting port 18 is located on first side 22 of transmission block 20 with the input side of multiplexed signal transmitting port 18 facing first surface 24 of transmission block 20.

Figure 2:
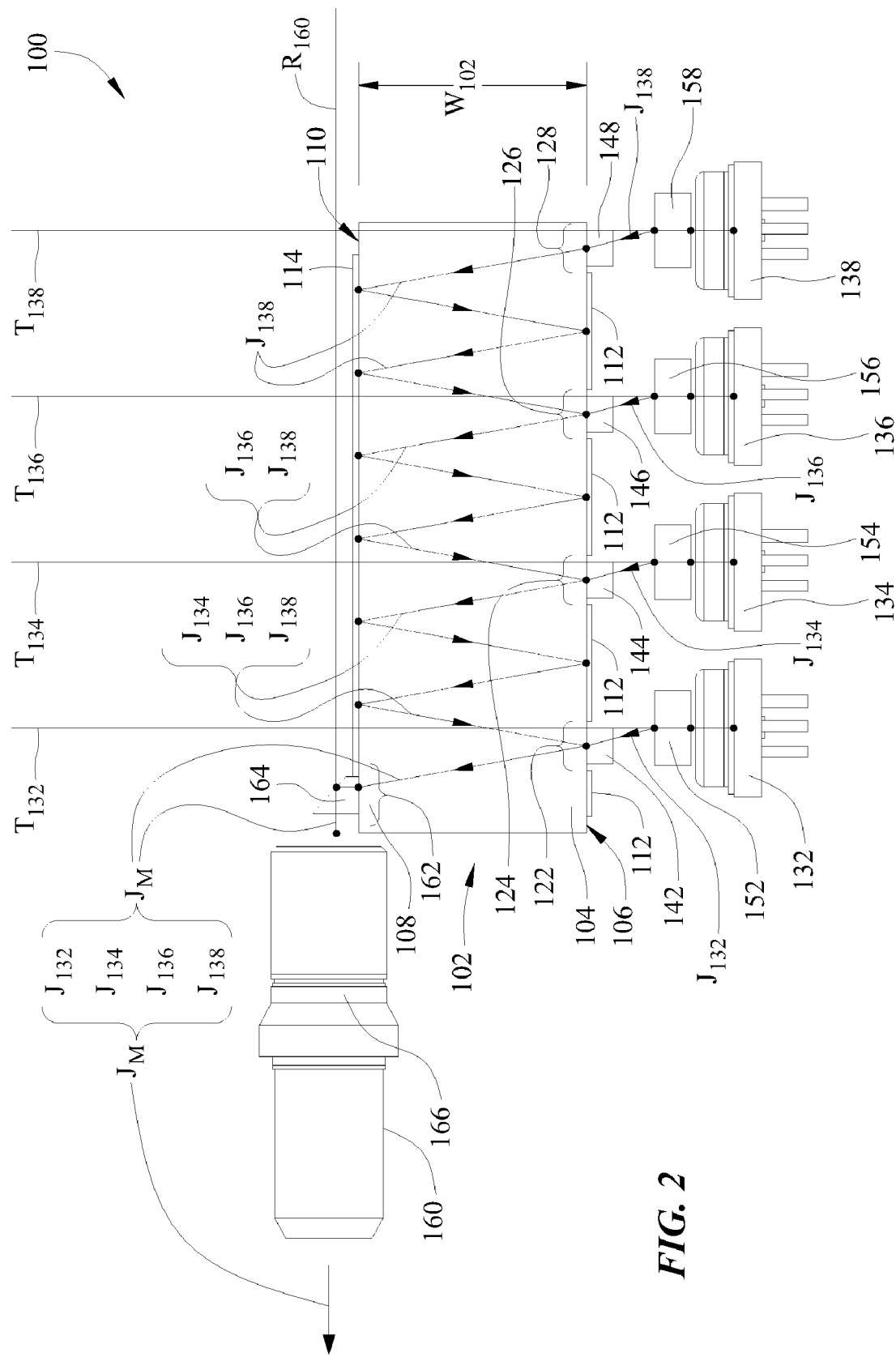
FIG. 2 is a diagram depicting an embodiment of an optical multiplexer that incorporates teachings of the present invention.

The location on first surface 24 at which each respective transmission axis is oriented is the location at which a transmitted signal traveling along that transmission axis will enter transmission block 20. As used hereinafter, the expression "admission window" employed by reference to a transmitted signal is intended to refer to the location on a surface of a transmission block, such as transmission block 10, at which that transmitted signal is intended or able to enter into the transmission block. Thus as illustrated in FIG. 2, the transmission axis of first laser 11 is oriented at a first admission window 31 on first surface 24 of transmission block 10, while the transmission axis of second laser 12 is oriented at a second admission window 32 on second surface 28 of transmission block 10. Meanwhile, the transmission axis of third laser 13 is oriented at a third admission window 33 on first surface 24 of transmission block 10, and the transmission axis of fourth laser 14 is oriented at a fourth admission window 34 on second surface 28 of transmission block 10.

The output side of each of lasers 11, 12, 13, and 14 is provided with a corresponding transmitted signal isolator that prevents any portion of a transmitted signal reflected externally or internally by other components of multiplexer 10 from reaching the output side of the laser, as this could cause damage to the laser otherwise interfere with optimum laser operation. Thus, a shown in FIG. 1, a first transmitted signal isolator 61 is positioned at the output side of first laser 11, a second transmitted signal isolator 62 is positioned at the output side of second laser 12, a third transmitted signal isolator 63 is positioned at the output side of third laser 13, and a fourth transmitted signal isolator 64 is positioned at the output side of fourth laser 14.

A transmission filter is associated with each of lasers 11-14 and is positioned at and about the admission window on first surface 24 or second surface 28 of transmission block 20 at which the transmission axis of individual of lasers 11-14 is oriented. Each filter passes signals at the transmission wavelength with each respective laser functions. Thus, each transmission filter also bars passage of transmitted signals, or of reflected components of transmitted signals, at any other wavelength. From the interior of transmission block 20, these transmission filters function as mirrors, reflecting back toward the interior of transmission block 20 any transmitted signals at those other wavelengths that approaches first surface 24 or second surface 28 of transmission block 20 from the interior thereof.

As accordingly illustrated in FIG. 1, a first transmission filter 71 is positioned on first surface 24 of transmission block 20 at and about first admission window 31 at which are directed the transmission axis of first laser 11 and any first transmitted signal $L_1$ at first transmission wavelength $\lambda_1$ produced thereby. First transmission filter 71 passes signals at first transmission wavelength $\lambda_1$ and bars passage of signals at any other optical wavelength.

Thus, first transmission filter 71 permits first transmitted signal $L_1$ to enter transmission block 20 at first admission window 31 at an angle of refraction $A_1$ from the perpendicular to first surface 24 of transmission block 20 at first admission window 31. Correspondingly, first transmission filter 71 bars passage into transmission block 20 at first admission window 31 of signals and components of signals at any wavelength other than at first transmission wavelength $\lambda_1$. Finally, first transmission filter 71 also reflects back toward the interior of transmission block 20 signals and components of signals at any optical wavelength other than first transmission wavelength $\lambda_1$.

Each of the balance of the transmission filters shown in FIG. 1 will be described individually below.

As illustrated in FIG. 1, a second transmission filter 72 is positioned on second surface 28 of transmission block 20 at and about second admission window 32 at which are directed the transmission axis of second laser 12 and any second transmitted signal $L_2$ at second transmission wavelength $\lambda_2$ produced thereby. Second transmission filter 72 passes signals at second transmission wavelength $\lambda_2$ and bars passage of signals at any other transmission wavelength.

Thus, second transmission filter 72 permits second transmitted signal $L_2$ to enter transmission block 20 at second admission window 32. Correspondingly, second transmission filter 72 bars passage into transmission block 20 at second admission window 32 of signals and components of signals at any wavelength other than at second transmission wavelength $\lambda_2$. Finally, second transmission filter 72 also reflects back toward the interior of transmission block 20 signals and components of signals at any optical wavelength other than second transmission wavelength $\lambda_2$. Therefore, as shown, second transmission filter 72 reflects back toward the interior of transmission block 20 first transmitted signal $L_1$, which is at a wavelength different from second transmission wavelength $\lambda_2$.

First transmitted signal $L_1$ thus commences a series of reflections interior of transmission block 20 that collectively progress first transmitted signal $L_1$ toward multiplexed signal transmitting port 18 in a direction parallel to first surface 24 and second surface 28 of transmission block 20. In that series of reflections, first transmitted signal $L_1$ is accompanied after second admission window 32 by second transmitted signal $L_2$ as shown.

A third transmission filter 73 is positioned on first surface 24 of transmission block 20 at and about third admission window 33 at which are directed the transmission axis of third laser 13 and any third transmitted signal $L_3$ at third transmission wavelength $\lambda_3$ produced thereby. Third transmission filter 73 passes signals at third transmission wavelength $\lambda_3$ and bars passage of signals at any other optical wavelength.

Thus, third transmission filter 73 permits third transmitted signal $L_3$ to enter transmission block 20 at third admission window 33. Correspondingly, third transmission filter 73 bars passage into transmission block 20 at third admission window 33 of signals and components of signals at any wavelength other than at third transmission wavelength $\lambda_3$. Finally, third transmission filter 73 also reflects back toward the interior of transmission block 20 signals and components of signals at any optical wavelength other than third transmission wavelength $\lambda_3$. Therefore, as shown, third transmission filter 73 reflects back toward the interior of transmission block 20 transmitted signals $L_1$-$L_2$, which are at wavelengths different from third transmission wavelength $\lambda_3$.

Second transmitted signal $L_2$ thus commences and joins first transmitted signal $L_1$ in a shared series of reflections interior of transmission block 20 that collectively progress second transmitted signal $L_2$ and first transmitted signal $L_1$ toward multiplexed signal transmitting port 18 in a direction parallel to first surface 24 and second surface 28 of transmission block 20. In that series of reflections, second transmitted signal $L_2$ and first transmitted signal $L_1$ are accompanied after third admission window 33 by third transmitted signal $L_3$ as shown.

Finally, a fourth transmission filter 74 is positioned on second surface 28 of transmission block 20 at and about fourth admission window 34 at which are directed the transmission axis of fourth laser 14 and any fourth transmitted signal $L_4$ at fourth transmission wavelength $\lambda_4$ produced thereby. Fourth transmission filter 74 passes signals at fourth transmission wavelength $\lambda_4$ and bars passage of signals at any other optical wavelength.

Thus, fourth transmission filter 74 permits fourth transmitted signal $L_4$ to enter transmission block 20 at fourth admission window 34. Correspondingly, fourth transmission filter 74 bars passage into transmission block 20 at fourth admission window 34 of signals and components of signals at any wavelength other than at fourth transmission wavelength $\lambda_4$. Finally, fourth transmission filter 74 also reflects back toward the interior of transmission block 20 signals and components of signals at any optical wavelength other than fourth transmission wavelength $\lambda_4$. Therefore, as shown, fourth transmission filter 72 reflects back toward the interior of transmission block 20 transmitted signals $L_1$-$L_3$, which are at wavelengths different from fourth transmission wavelength $\lambda_4$.

Third transmitted signal $L_3$ thus commences and joins transmitted signals $L_1$-$L_2$ in a shared additional reflection interior of transmission block 20 that progress transmitted signals $L_1$-$L_3$ toward multiplexed signal transmitting port 18 in a direction parallel to first surface 24 and second surface 28 of transmission block 20. After fourth admission window 34, transmitted signals $L_1$-$L_3$ are accompanied by fourth transmitted signal $L_4$ as shown.

Transmitted signals $L_1$-$L_4$ thereafter emerge in mutual optical alignment from first surface 24 of transmission block 20 as multiplexed transmission signal $L_M$ and enter the input side of multiplexed signal transmitting port 18 for retransmission in consolidated form.

In achieving this result, among all of transmitted signals $L_1$-$L_4$, first transmitted signal $L_1$ engages in the longest path of travel interior of transmission block 20. Entering transmission block 20 through first transmission filter 71 at first admission window 31, first transmitted signal $L_1$ travels across transmission block 20 to second admission window 32 on second surface 28. There first transmitted signal $L_1$ is reflected back toward the interior of transmission block 20 by second transmission filter 72. Returning across transmission block 20 to third admission window 33 on first surface 24, first transmitted signal $L_1$ is reflected toward the interior of transmission block 20 a second time, on this occasion by third transmission filter 73. First transmitted signal $L_1$ then passes across transmission block 20 again to fourth admission window 34 on second surface 28. There first transmitted signal $L_1$ is reflected toward the interior of transmission block 20 by fourth transmission filter 74. Finally, first transmitted signal $L_1$ travels across transmission block 20 for the last time, emerging from first surface 24 of transmission block 20 as part of multiplexed transmission signal $L_M$.

Second transmitted signal $L_2$ engages in a less lengthy path of travel interior of transmission block 20, but one that is nonetheless longer than that traveled by third transmitted signal $L_3$ or fourth transmitted signal $L_4$. Entering transmission block 20 through second transmission filter 72 at second admission window 32, second transmitted signal $L_2$ travels across transmission block 20 to third admission window 33 on first surface 24. There second transmitted signal $L_2$ is reflected toward the interior of transmission block 20 by third transmission filter 73. Second transmitted signal $L_2$ then passes across transmission block 20 again to fourth admission window 34 on second surface 28. There second transmitted signal $L_2$ is reflected toward the interior of transmission block 20 by fourth transmission filter 74. Finally, second transmitted signal $L_2$ travels across transmission block 20 for the last time, emerging from first surface 24 of transmission block 20 as part of multiplexed transmitted signal $L_M$.

The path of travel undertaken interior of transmission block 20 by third transmitted signal $L_3$ even shorter, and less complicated. Entering transmission block 20 through third transmission filter 73 at third admission window 33, third transmitted signal $L_3$ travels across transmission block 20 to fourth admission window 34 on second surface 28. There third transmitted signal $L_3$ is reflected toward the interior of transmission block 20 by fourth transmission filter 74. Third transmitted signal $L_3$ then travels across transmission block 20, emerging from first surface 24 of transmission block 20 as part of multiplexed transmission signal $L_M$.

Fourth transmitted signal $L_4$ enters transmission block 20 through fourth transmission filter 74 at fourth admission window 34 and then simply travels across transmission block 20 without experiencing any internal reflections whatsoever to emerge from first surface 24 of transmission block 20 as the final component of multiplexed transmission signal $L_M$.

A demultiplexer configured according to the principles illustrated in known multiplexer 10 of FIG. 1 would use a multiplexed signal receiving port in place of multiplexed signal transmitting port 18 and a plurality of optical detectors positioned on both sides of transmission block 20 in place individually of lasers 11-14. The demultiplexer would process signals traveling in directions essentially opposite from those indicated for multiplexed transmission signal $L_M$ and transmitted signals $L_1$-$L_4$ in multiplexer 10 in FIG. 1.

The multiplexed transmitted signal receiving port of the multiplexer would direct into transmission block 20 through first surface 24 thereof a multiplexed reception signal made up of constituent received signals at respective distinct optical wavelengths. The multiplexed reception signal would then be reflected internally of transmission block 20 between the opposed surfaces thereof and deconstructed in the process into those constituent received signals. These would then be delivered individually through transmission filters 71-74 to a corresponding of the optical detectors for retransmission independently.

Several disadvantages presented in multiplexer 10, as well as in a correspondingly configured known demultiplexer of the type described immediately above, have been recognized by the coinventors of the present invention and resolved through the teachings thereof. A sampling of some of those disadvantages will be presented immediately below, following which the present invention will be disclosed by making reference to exemplary embodiments thereof.

The overall size of multiplexer 10, or of a correspondingly configured known demultiplexer, is relatively large. The size of such optical devices is largely a function of the thickness $W_{20}$ of transmission block 20. For example, lasers, such as lasers 11-14, used in a TO-56 package, or of optical detectors of a correspondingly configured known demultiplexer, have diameters of about 5.6 mm. The distance between the transmission axes of lasers of this size, or between receiving axes of corresponding optical detectors, should be greater than about 6.2 mm. For a typical angle of incidence $\alpha$=about 13.5 degrees in air of optical transmission signals or of optical reception signals relative to transmission filters 71-74, it should be the case that angle of refraction $A_1$=about 9.3 degrees. Under such conditions, however, it will be necessary that transmission block 20 have a width $W_{20}$=20 mm. Such a dimension in transmission block 20 is incompatible with compact sizing requirements associated with contemporary transceivers, such as the Xenpak receiver or the X2 transceiver.

To facilitate easy coupling with a transceiver or the efficient replacement of components thereof, the constituent elements of a demultiplexer or of a multiplexer, should relate functionally to each other and to the overall architecture of the transceiver along functional axes that harmonize with axes standard in industry. That is not the case with multiplexer 10, or with a correspondingly configured demultiplexer, where the transmission axes of lasers 11-14 are at a relatively arbitrary angle of incidence $\alpha$ to the surfaces of transmission block 20, or where the receiving axis of multiplexed signal transmitting port 18 is at another incidentally determined angle to the surfaces of transmission block 20 and to the transmission axes of lasers 11-14. Such are less than ideal spatial relationships among functional components in subsytems intended for use in increasingly modularly related optical systems, such as optical systems employing optical transceivers.

Due to the absence from multiplexer 10, or from a correspondingly configured demultiplexer, of ideal spatial relationships among functional components, optical multiplexer functions must be preformed by structures distinct from the structures that perform optical demultiplexer functions. Should both functions be required in a single transceiver, for example, distinct hardware must be dedicated to each function. Furthermore, distinct spaces must be accorded in that single optical device to multiplexer hardware and to demultiplexer hardware. Transceiver size and cost are both impacted adversely.

Isolators, such as transmitted signal isolators 61-64, can be the most costly components in a multiplexer, such as multiplexer 10. Accordingly, the resort to the use of a proliferation of such isolators to protect the plurality of lasers 11-14 employed in multiplexer 10 is less than desirable.

Although the present invention provides a unitary structure that is capable of performing both, the function associated with an optical multiplexer, and the function associated with an optical demultiplexer, the present invention also includes teachings directed toward the design and construction individually of a spatially-efficient optical multiplexer and of a spatially-efficient optical demultiplexer. Accordingly, these individual aspects of the present invention will first be explored completely, before discussing the combination of both in an inventive unitary optical multiplexer and demultiplexer.

FIG. 2 depicts one embodiment of an optical multiplexer 100 incorporating teachings of the present invention. Multiplexer 100 is so configured as to be capable of combining four input transmitted signals at respective distinct optical wavelengths into a single output that takes the form of a multiplexed transmission signal. A smaller or a larger number of such input transmission signals may be combined into a single multiplexed transmission signal output in other embodiments of the present invention. Centrally, multiplexer 100 includes an optical transmission block 102 that has on a first side 104 thereof a planar first surface 106 and on an opposed second side 108 thereof a planar second surface 110 that is parallel to first surface 106. As measured between first surface 106 and second surface 110, transmission block 102 has a width $W_{102}$. In the embodiment of the invention shown in FIG. 2, transmission block 102 is made of a silicon-based optically transparent material. Nonetheless, other optically transmitting materials may be particularly suited for use in other embodiments of the present invention.

Transmission block 102 is rendered internally and externally reflective of optical signals by a highly reflective first coating 112 on first surface 106 and a highly reflective second coating 114 on second surface 110. In the embodiment of the invention depicted in FIG. 2, coatings 112, 114 may be layers of tantalum oxide ($Ta_2O_5$) or silicon oxide ($Si_2O_4$). In other embodiments alternative, reflective coatings may prove advantageous. Coatings 112, 114, may deposited or applied to first surface 106 and to second surface 110, respectively, in any manner and at any stage of fabrication that is consistent with the conditions of use intended for multiplexer 100. It is not necessary, however, that each of coatings 112, 114, be identical in material composition or in thickness. Neither is it essential according to teachings of the present invention that coatings 112, 114, be deposited or applied contemporaneously or in identical manners.

Formed through first coating 112 at selected locations along first surface 106 are a plurality of admission windows at which first surface 106 of transmission block 102 is neither internally nor externally reflective of optical signals. The plurality of admission windows depicted in FIG. 2 includes a first admission window 122, a second admission window 124, a third admission window 126, and a fourth admission window 128. The number of admission windows in a reflective coating, such as first coating 112, will vary with and generally correspond at least to the number of optical transmission signals at distinct optical wavelengths that are to be combined by a multiplexer, such as multiplexer 100. Therefore, a smaller or a greater number of such admission windows may be required in other inventive multiplexer embodiments.

Admission windows in first coating 112 are created by any process harmonious with the methods by which a multiplexer, such as multiplexer 100, is to be manufactured. Thus, for example, the admission windows in first coating 112 may be formed by masking the location of each intended admission window when first coating 112 is originally deposited on or applied to transmission block 102. Alternatively, first coating 112 may be deposited or applied to the entirety of first surface 106, while portions of first coating 112 are removed subsequently at each location intended for an admission window.

Also included in multiplexer 100 is a plurality of lasers that are positioned on the same side of transmission block 102, in the case illustrated in FIG. 2 on first side 104. Each of the lasers is capable of producing transmitted signals at a respective individual transmission wavelength, wherefore a smaller or a larger number of lasers may be employed in other embodiments of the invention, depending on the number of transmitted signals to be combined into a single multiplexed transmission signal. The transmission axis of each of the lasers is desirable oriented at and substantially normal to first surface 106 of transmission block 102.

The plurality of lasers shown in the embodiment of FIG. 2 includes a first laser 132, a second laser 134, a third laser 136, and a fourth laser 138. First laser 132 produces transmitted signals $J_{132}$ at a first transmission wavelength $\lambda_{132}$ and has a transmission axis $T_{132}$ that is oriented at and substantially normal to first surface 106 of transmission block 102. Second laser 134 produces transmitted signals $J_{134}$ at a second transmission wavelength $\lambda_{134}$ and has a transmission axis $T_{134}$ that is also oriented at and substantially normal to first surface 106. Third laser 136 produces transmitted signals $J_{136}$ at a third transmission wavelength $\lambda_{136}$ and has a transmission axis $T_{136}$ that is oriented at and substantially normal to first surface 106. Finally, fourth laser 138 produces transmitted signals $J_{138}$ at a fourth transmission wavelength $\lambda_{138}$ and has a transmission axis $T_{138}$ that is in addition oriented at and substantially normal to first surface 106 of transmission block 102. Appropriate lasers for use in multiplexer 100 include FP lasers, DBF lasers, and VCSEL lasers.

Each of the lasers shown in FIG. 2 is associated with a corresponding one of the admission windows formed in first coating 112 on first surface 106 of transmission block 102. Thus, first admission window 122 is associated with first laser 132, second admission window 124 is associated with second laser 134, third admission window 126 is associated with third laser 136, and finally, fourth admission window 128 is associated with fourth laser 138.

Located between each laser of multiplexer 100 and the admission window associated therewith are a pair of additional associated structures.

The first of these additional associated structures is an optical filter that is positioned on first surface 106 of transmission block 102 filling the associated admission window. Each such optical filter operates at the transmission wavelength of the associated laser, thereby blocking from entry into or egress from transmission block 102 through the admission window in which it is located any signal other than transmitted signals at the transmission wavelength of the associated laser. From the interior of transmission block 102, these transmission filters function as mirrors, reflecting back toward the interior of transmission block 102 any transmitted signals at those other wavelengths that approaches first surface 106 or second surface 110 of transmission block 102 from the interior thereof.

Thus, a first transmission filter 142 operating at first transmission wavelength $\lambda_{132}$ is positioned in first admission window 122. First transmission filter 142 permits first transmitted signals $J_{132}$ to enter transmission block 102 at first admission window 122, but bars passage into transmission block 102 at first admission window 122 of transmitted signals and components of transmitted signals at any wavelength other than at first transmission wavelength $\lambda_{132}$. In addition, first transmission filter 142 reflects back toward the interior of transmission block 102 transmitted signals and components of transmitted signals at any wavelength other than at first transmission wavelength $\lambda_{132}$.

A second transmission filter 144 operates at second transmission wavelength $\lambda_{134}$ and is positioned in second admission window 124. Second transmission filter 144 permits second transmitted signals $J_{134}$ to enter transmission block 102 at second admission window 124, but bars passage into transmission block 102 at second admission window 124 of transmitted signals and components of transmitted signals at any wavelength other than at second transmission wavelength $\lambda_{134}$. In addition, second transmission filter 144 reflects back toward the interior of transmission block 102 transmitted signals and components of transmitted signals at any wavelength other than at first transmission wavelength $\lambda_{134}$.

A third transmission filter 146 that operates at second transmission wavelength $\lambda_{136}$ is positioned in third admission window 126. Third transmission filter 146 permits third transmitted signals $J_{136}$ to enter transmission block 102 at third admission window 126, but bars passage into transmission block 102 at third admission window 126 of transmitted signals and components of transmitted signals at any wavelength other than at third transmission wavelength $\lambda_{136}$. In addition, third transmission filter 142 reflects back toward the interior of transmission block 102 transmitted signals and components of transmitted signals at any wavelength other than at third transmission wavelength $\lambda_{132}$.

Finally, a fourth transmission filter 148 operating at fourth transmission wavelength $\lambda_{138}$ is positioned in fourth admission window 128. Fourth transmission filter 148 permits fourth transmitted signals $J_{138}$ to enter transmission block 102 at fourth admission window 128, but bars passage into transmission block 102 at fourth admission window 128 of transmitted signals and components of transmitted signals at any wavelength other than at fourth transmission wavelength $\lambda_{138}$. In addition, fourth transmission filter 148 reflects back toward the interior of transmission block 102 transmitted signals and components of transmitted signals at any wavelength other than at fourth transmission wavelength $\lambda_{138}$.

The second additional associated structure located between each laser of multiplexer 100 and the admission window associated therewith is a lens that is positioned in close proximity to the output side of each laser in alignment with the transmission axis thereof. Each lens is capable of reorienting transmitted signals from the associated laser through an acute angle away from the transmission axis of that laser and along a redirected transmission pathway to the associated transmission filter positioned in the associated admission window.

Thus, as seen in FIG. 2, a first lens 152 is associated with first laser 132 and positioned at the output side of first laser 132 between first laser 132 and first transmission filter 142 in first admission window 122. A second lens 154 associated with second laser 134 is positioned between the output side of second laser 134 and second transmission filter 144 in second admission window 124. Similarly, associated with third laser 136 is a third lens 156 that is positioned between the output side of third laser 136 and third transmission filter 146 in third admission window 126. Finally, associated with fourth laser 158 is a fourth lens 148 that is positioned between the output side of fourth laser 158 and fourth transmission filter 148 in fourth admission window 128.

Multiplexer 100 also includes a multiplexed signal transmitting port 160 that is disposed on second side 108 of transmission block 102. Multiplexed signal transmitting port 160 is positioned to receive transmitted signals from the plurality of lasers in multiplexer 100, once those transmitted signals are placed in mutual optical alignment as a single multiplexed transmission signal $J_M$ by being reflected within transmission block 102 toward multiplexed signal transmitting port 160 between the first coating 112 and second coating 114. As seen in FIG. 2, multiplexed transmission signal $J_M$ emerges from transmission block 102 at a multiplexed transmitted signal egress window 162 in second coating 114.

Multiplexer 100 further includes a prism 164 positioned between multiplexed signal egress window 162 and multiplexed signal transmission port 160. Prism 164 is capable of bending the path of multiplexed transmission signal $J_M$ into optical alignment with the optical receiving axis $R_{160}$ of transmitting port 160. Advantageously then, receiving axis $R_{160}$ of multiplexed signal transmitting port 160 can be made to be parallel to second surface 110 of transmission block 102. This harmonizes the functional axis of multiplexed signal transmitting port 160 with axes otherwise standard in industry, facilitating easy coupling and replacement of a multiplexer, such as multiplexer 100, as a modular component among others in a complex optical system.

Transmitted signals from the plurality of lasers in multiplexer 100 are optically aligned by repeated internal reflections within transmission block 102 between first side 104 and second side 108 thereof. The series of reflections undergone by each of the transmitted signals progresses the transmitted signals within transmission block 102 toward multiplexed signal transmitting port 160 in a direction parallel to first side 104 and second side 108.

In achieving this result, among all of the transmitted signals, fourth transmitted signal $J_{138}$ engages in the longest path of travel interior of transmission block 102. Entering transmission block 102 through fourth transmission filter 148 at fourth admission window 128, fourth transmitted signal $J_{138}$ travels across transmission block 102 slightly in the direction of multiplexed signal transmission port 160 to second coating 114 on second surface 110. There fourth transmitted signal $J_{138}$ is reflected back across transmission block 102, again trending in the direction of multiplexed signal transmitting port 160, to first coating 112 on first surface 106. Reflections continue, sending fourth transmitted signal $J_{138}$ across transmission block 102 to second coating 114 and back across transmission block 102 to first surface 106, always in the direction of multiplexed signal transmitting port 160. On this second return to first surface 106, however, fourth transmitted signals $J_{138}$ encounters third transmission filter 146 in third admission window 126. There, fourth transmitted signal $J_{138}$ is reflected onward between first surface 106 and second surface 110 in the direction of multiplexed signal transmitting port 160, but fourth transmitted signals $J_{138}$ is joined in those additional internal reflections by third transmitted signal $J_{136}$, which enters transmission block 102 through third transmission filter 146 in third admission window 126.

Third transmitted signal $J_{136}$ and fourth transmitted signals $J_{138}$ are optically aligned from third admission window 126 onward during subsequent internal reflections. Those reflections continue between first coating 112 on first surface 106 and second coating 114 on second surface 110, until third transmitted signal $J_{136}$ and fourth transmitted signals $J_{138}$ encounter second transmission filter 144 in second admission window 124. There, third transmitted signal $J_{136}$ and fourth transmitted signal $J_{138}$ are reflected onward between first surface 106 and second surface 110 in the direction of multiplexed signal transmitting port 160, but third transmitted signal $J_{136}$ and fourth transmitted signal $J_{138}$ are joined in those additional internal reflections by second transmitted signal $J_{134}$, which enters transmission block 102 through second transmission filter 144 in second admission window 124.

Second transmitted signal $J_{134}$, third transmitted signal $J_{136}$, and fourth transmitted signal $J_{138}$ are optically aligned from second admission window 124 onward during subsequent internal reflections. Those reflections continue between first coating 112 on first surface 106 and second coating 114 on second surface 110, until second transmitted signal $J_{134}$, third transmitted signal $J_{136}$, and fourth transmitted signals $J_{138}$ encounter first transmission filter 142 in first admission window 122. There, second transmitted signal $J_{134}$, third transmitted signal $J_{136}$, and fourth transmitted signal $J_{138}$ are reflected onward between first surface 106 and second surface 110 in the direction of multiplexed signal transmitting port 160, but second transmitted signal $J_{134}$, third transmitted signal $J_{136}$, and fourth transmitted signal $J_{138}$ are joined in those additional internal reflections by first transmitted signal $J_{132}$, which enters transmission block 102 through first transmission filter 142 in first admission window 122.

Thereafter, first transmitted signal $J_{132}$, second transmitted signal $J_{134}$, third transmitted signal $J_{136}$, and fourth transmitted signal $J_{138}$ are optically aligned as multiplexed transmission signal $J_M$, which makes a single transit across transmission block 102 to multiplexed signal egress window 162, through prism 164, and then toward multiplexed signal transmitting port 160 for retransmission.

The input side of multiplexed signal transmitting port 160 is provided with an optical isolator that prevents any portion of a multiplexed transmitted signal that enters multiplexed signal transmitting port 160 from being reflected from multiplexed signal transmitting port 160 back into multiplexer 100. Such an event could cause damage to the lasers employed therein, or otherwise interfere with optimum operation. Thus, as shown in FIG. 2, a multiplexed transmitted signal isolator 166 is positioned at the output side of multiplexed signal transmitting port 160 between transmitting port 160 and prism 164.

Figure 3:
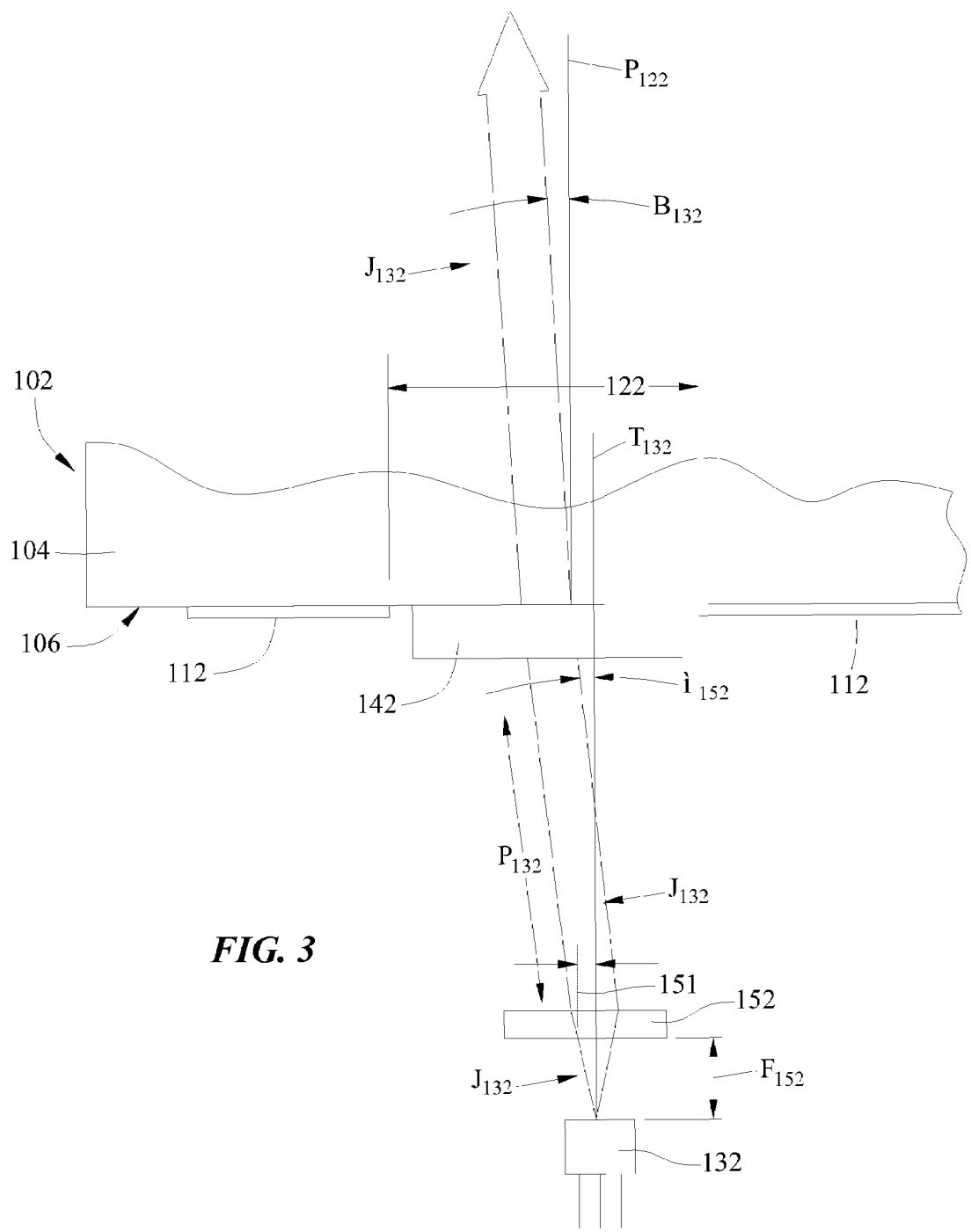
FIG. 3 is an enlarged diagrammatic depiction of a lens, a transmission filter, and an admission window associated with each of the lasers that is used to provide a transmitted signal as an input to the multiplexer of FIG. 2.
Figure 4:
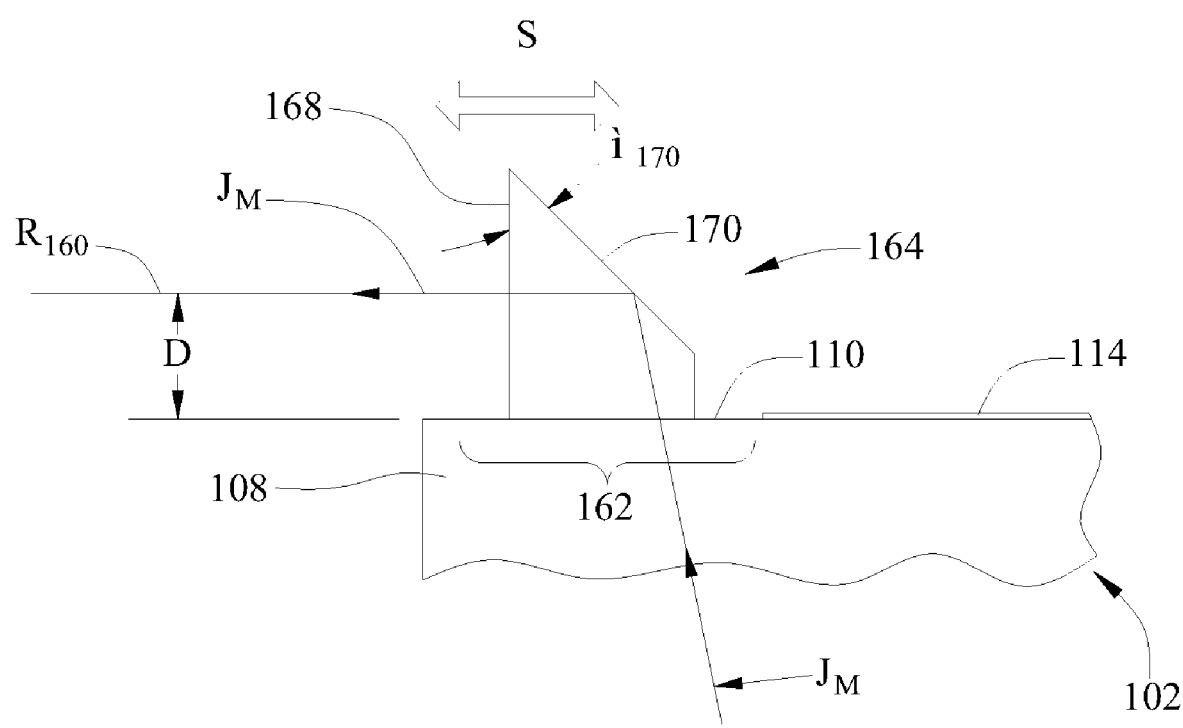
FIG. 4 is an enlarged diagrammatic depiction of the prism that is used to affect the path of the multiplexed transmitted signal produced by the multiplexer of FIG. 2

Selected portions of multiplexer 100 will be addressed in further detail relative to the enlarged depictions presented in FIGS. 3-5.

FIG. 3 is a diagrammatic depiction of a typical laser and the set of lens, transmission filter, and admission aperture associated therewith in multiplexer 100. There, first laser 132 is shown and first admission window 122 that is associated therewith. Between first laser 132 and first admission window 122, the associated first transmission filter 142 and first lens 152 also appear. First laser 132 produces transmitted signals $J_{132}$ at first transmission wavelength $\lambda_{132}$. Transmitted signals $J_{132}$ emerge from the output side of first laser 132 directed toward first surface 106 of transmission block 102 and in alignment with transmission axis $T_{132}$ of first laser 132.

First lens 152 is optically aligned with transmission axis $T_{132}$ of first laser 132 at a focal length $F_{152}$ away from the output side of first laser 132. Focal length $F_{152}$ is determined by the nature of first laser 132 and other performance criteria intended for multiplexer 100. For example, if a laser transmits an optical signal with a small beam spot on the order of 1 microns, is all too easy to produce undesirable amounts of beam divergence during optical manipulation of the optical signals produced. In order to achieve a suitable beam diameter of $J_{132}$ after first lens 152, for example 500 um, focal length $F_{152}$ is maintained quite small, in a range of from about 0.8 to about 1.0 millimeters.

It is the function of first lens 152 to reorient transmitted signals $J_{132}$ from first laser 132 through an acute tilt angle $\mu_{152}$ away from transmission axis $T_{132}$ along a redirected transmission pathway $P_{132}$ to first admission window 122. The distance between laser's axis $T_{132}$ and first lens' optical axis 151 determines the tilted angle $\mu_{152}$ of $P_{132}$. There transmitted signals $J_{132}$ pass through first transmission filter 142 and enter transmission block 102 at an angle of refraction $B_{132}$ from the perpendicular $P_{122}$ to first surface 106 of transmission block 102 at first admission window 122.

Tilt angle $\mu_{152}$ of beam $P_{132}$ is set equal to the angle of incidence in air for first transmission filter 142. Reorienting the transmission pathway for transmitted signals $J_{132}$ in this manner permits the desirable result of being able to position first laser 132 with transmission axis $T_{132}$ oriented at and substantially normal to first surface 106 of transmission block 102. This harmonizes the functional axis of first laser 132 with axes otherwise standard in industry, facilitating easy coupling and replacement of a multiplexer, such as multiplexer 100, as a modular component among others in a complex optical system. In one embodiment of multiplexer 100, satisfactory performance has been achieved with tilt angle $\mu_{152}$=13.5 degrees. Suitable lenses for use as first lens 152 include A-type lenses, D-type lenses, Grin lenses, and Ball lenses.

FIG. 4 depicts prism 164 on second side 108 of transmission block 102 in multiplexer 100. Prism 164 is made from fused silica and is bonded to second surface 110 of transmission block 102 by an epoxy adhesive possessed of an optical index close to that of fused silica. Prism 164 has a longest face 168 that is perpendicular to second surface 110 and an inclined face 170 that forms a dihedral incline angle $\delta_{170}$ with longest face 168.

Multiplexed transmission signal $J_M$ emerges from transmission block 102 through multiplexed signal egress window 162 and enters prism 164 through the side thereof that is secured to transmission block 102. Incline angle $\delta_{170}$ is calculated to permit prism 164 to bend the path of multiplexed transmission signal $J_M$ into alignment with receiving axis $R_{160}$ of multiplexed signal transmitting port 160. Optimally, the path of multiplexed transmission signal $J_M$ would then be parallel to second surface 110 of transmission block 102, and multiplexed signal transmitting port 160 could be positioned on second side 108 of transmission block 102 with receiving axis $R_{160}$ parallel to second surface 110. In one embodiment of the inventive technology, it has been found to facilitate this objective by setting incline angle $\delta_{170}$=49.6±0.1 degrees.

The longitudinal positioning of prism 164 along second surface 110 of transmission block 102 at multiplexed signal egress window 162 can be used to determine the separation distance D from second surface 110 of the path that transmission signal $J_M$ travels after passing through prism 164. This in turn is equivalent to determining how far away from second surface 110 it is necessary to position receiving axis $R_{160}$, and in turn how to dispose multiplexed signal transmitting port 160 relative to the other elements of multiplexer 100. Altering the location of prism 164 in the manner suggested by two-sided arrow S in FIG. 4 will correspondingly vary separation distance D of multiplexed transmission signal $J_M$ from second surface 110. Shifting prism 164 in the direction indicated by the left side of arrow S will reduce separation distance D, while shifting prism 164 in the direction indicated by the right side of arrow S will increase separation distance D.

Figure 5A:
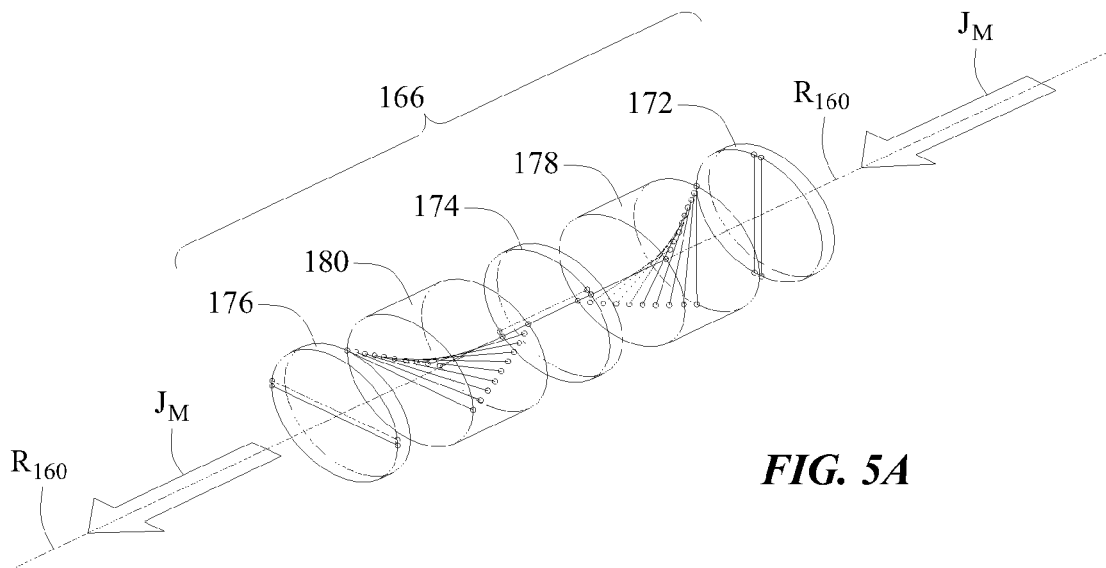
FIGS. 5A and 5B are related diagrams that illustrate, respectively, the transmission of a multiplexed transmitted signal in one direction through a multiplexed transmitted signal isolator at the input side of the multiplexed signal transmitting port of the multiplexer of FIG. 2, and the absorption of a multiplexed transmitted signal attempting to pass in the opposite direction through the multiplexed transmitted signal isolator.
Figure 5B:
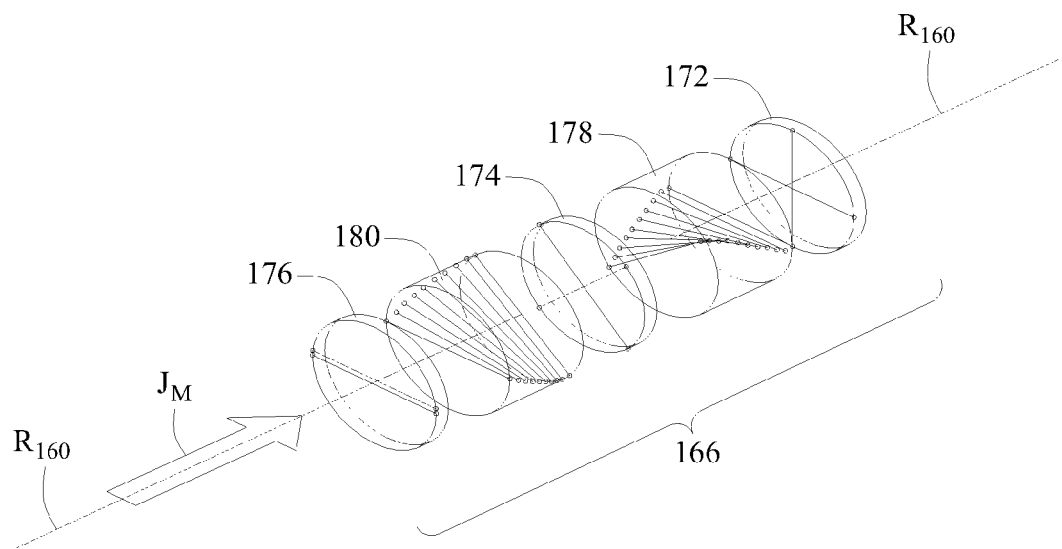

FIGS. 5A and 5B are related diagrams that illustrate in exploded perspective the elements and operation of multiplexed transmission signal isolator 166 that is located on the input side of multiplexed signal transmitting port 160 in multiplexer 100 of FIG. 2.

Multiplexed transmission signal isolator 166 is a dual-stage, free space isolator that includes a first polarized disc 172, a second polarized disc 174, and a third polarized disc 176. First polarized disc 172 and second polarized disc 174 are disposed in an aligned, parallel relationship sandwiching a first garnet crystal 178 therebetween. On the opposite side of second polarized disc 174 from first garnet crystal 178 is a second garnet crystal 180. Second garnet crystal 180 is in turn sandwiched between second polarized disc 174 and third polarized disc 176, which are also in an aligned, parallel relationship. Receiving axis $R_{160}$ of multiplexed signal transmitting port 160 is included in FIGS. 5A and 5B by way of perspective.

During the use of multiplexed transmission signal isolator 166, third polarized disc 176 of multiplexed transmission signal isolator 166 is positioned in close proximity to multiplexed signal transmitting port 160, while third polarized disc 176 is located remotely therefrom. From this it can be appreciated that multiplexed transmission signal $J_M$ shown in FIG. 5A is successfully entering the input side of multiplexed signal transmitting port 160. On the other hand, multiplexed transmission signal $J_M$ shown in FIG. 5B is attempting, due to reflection or otherwise within multiplexed signal transmitting port 160, to escape therefrom along receiving axis $R_{160}$. In this attempt, multiplexed transmission signal $J_M$ is as intended, entirely unsuccessful.

The transparent direction of each of polarized discs 172, 124, and 176 is indicated by a diametrically disposed broken line thereupon. When the polarization direction of an optical signal passing through a portion of multiplexed transmission signal isolator 166 is aligned with the transparent direction of that portion, the optical signal passes without obstruction. On the other hand, if the polarization direction of an optical signal passing through a portion of multiplexed transmission signal isolator 166 is perpendicular to the transparent direction of that portion of multiplexed signal transmitting port 160, the optical signal is completely absorbed and blocked from passage. In FIG. 5A, multiplexed transmission signal $J_M$ passes without significant absorption through polarized discs 172, 174, and 176 of multiplexed transmission signal isolator 166. In the other direction of propagation, however, as shown in FIG. 5B, multiplexed transmission signal $J_M$ is completely absorbed by second polarized disc 174 and first polarized disc 172.

Generally, transmitted signals in optical systems are polarized, and the wavelength intervals maintained between plural lasers in a single optical device are quite small. For example, in an LX4 optical transceiver system, the transmission wavelengths of four lasers, such as lasers 132, 134, 136, and 138 in multiplexer 100 would be, respectively, 1275 nanometers, 1300 nanometers, 1325 nanometers, and 1350 nanometers. At these wavelength intervals, a single dual-stage free space isolator, such as multiplexed transmission signal isolator 166, is sufficient to prevent the return from multiplexed signal transmitting port 160 of any portion of a multiplexed transmission signal received thereby.

Figure 6A:
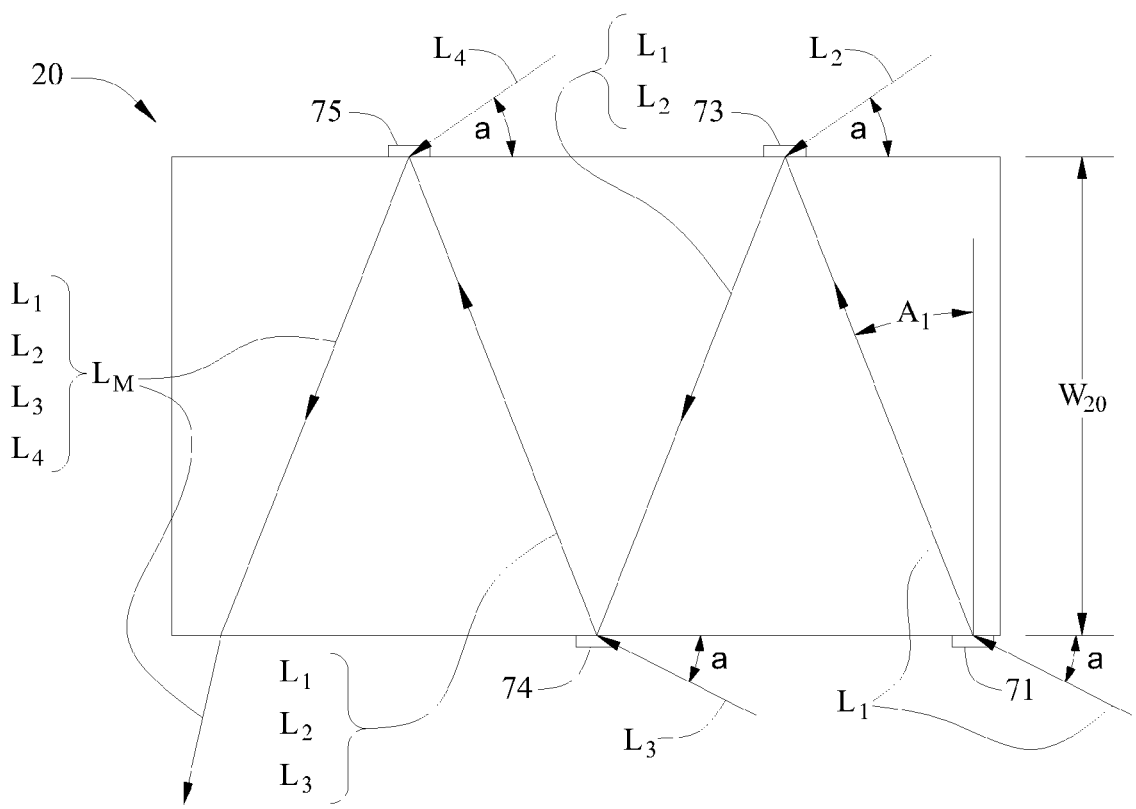
FIGS. 6A and 6B are related diagrams that illustrate an aspect of spatial efficiency promoted by the teachings of the present invention, making comparative reference, respectively, to the optical transmission block from the known optical multiplexer of FIG. 1, and to the optical transmission block from the inventive optical multiplexer of FIG. 2.
Figure 6B:
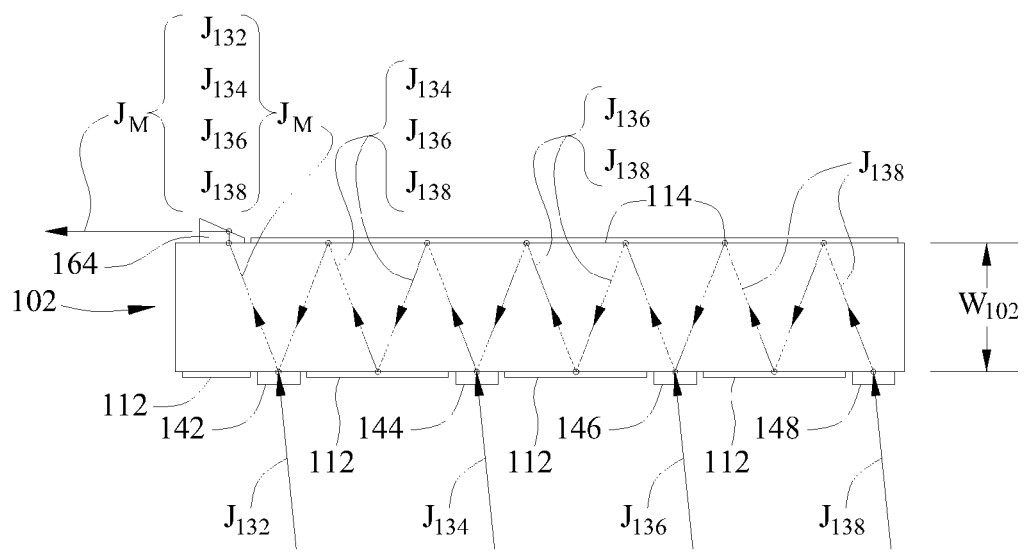

FIGS. 6A and 6B are related diagrams that illustrate an aspect of spatial efficiency promoted by the teachings of the present invention. FIG. 6A depicts optical transmission block 20 from known optical multiplexer 10 shown in FIG. 1, as well as the pathways of transmitted signals $L_1$-$L_4$ and multiplexed transmission signal $L_M$ into, within, and out of transmission block 20. By way of comparison, FIG. 6B depicts optical transmission block 102 from inventive optical multiplexer 100 shown in FIG. 2 and includes the pathways of transmitted signals $J_{132}$-$J_{138}$ and multiplexed transmission signal $J_M$ into, within, and out of transmission block 102.

As seen in FIG. 6A, in known multiplexer 10, internal reflections of transmitted signals in transmission block 20 occur exclusively at transmission filters 71-74. Therefore, in multiplexer 10, first transmitted signal $L_1$ experiences only three reflections within transmission block 20 and, following only four transits of transmission block 20, emerges therefrom in optical alignment with the other transmitted signals $L_2$-$L_4$ as multiplexed transmission signal $L_M$.

The spatial relationships among typical components in a known multiplexer, such as multiplexer 10 of FIG. 1, ultimately determine the minimum width able to be used in the transmission block thereof. For example, the distance between adjacent lasers, such as lasers 11-14, is about 6.2 millimeters. Typically, a common angle of incidence $\alpha=13.5$ degrees is maintained for the transmitted signal from each of those lasers with each of the associated transmission filters 71-74. Each of those transmitted signals then enters transmission block 20 at an angle of refraction $A_1=9.3$ degrees. Under these particular constraints, transmission block 20 will necessarily have a width $W_{20}=20$ millimeters. Such a size in transmission block 20 can, however, become an impedance to reducing size in new optical devices, such as optical transceivers.

As seen in FIG. 6B by contrast, in inventive multiplexer 100, internal reflections of transmitted signals in transmission block 102 occur not only at transmission filters 142, 144, 146, and 148, but at first coating 112 and at second coating 114. Therefore, in multiplexer 100, first transmitted signal $J_{132}$ experiences twelve reflections within transmission block 102, so that following thirteen transits of transmission block 102, first transmitted signal $J_{132}$ emerges from transmission block 102 in optical alignment with the other transmitted signals $J_{134}$-$J_{138}$ as multiplexed transmission signal $J_M$.

The cumulative distance of travel of transmitted signals within transmission block 102 is thus increased by several times relative to the cumulative distance of travel of transmitted signals within transmission block 20 in known multiplexer 10. Correspondingly, width $W_{102}$ of transmission block 102 need be only a fraction of width $W_{20}$ that is required in transmission block 20 of known multiplexer 10. Employing teachings of the present invention, it is possible to construct a multiplexer of reduced size having a transmission block, such as transmission block 102, having a width $W_{102}=10$ millimeters only. This in turn nets further advantages not directly related to the optical device into which transmission block 102 might become incorporated. For example, a smaller die can be used to manufacture transmission blocks, such as transmission block 102, than are required to manufacture transmission blocks for known multiplexers.

According to another aspect of the present invention, an optical signal multiplexer, such as multiplexer 100, can be made to include demultiplexing means cooperative with the transmission block thereof for separating a multiplexed reception signal into constituent received signals at respective distinct reception wavelengths. One embodiment of structures performing the function of a demultiplexing means according to teachings of the present invention is presented in FIG. 7 as a demultiplexer 200.

Demultiplexer 200 is so configured as to be capable of separating a single multiplexed reception signal containing four received signals at respective distinct optical reception wavelengths into those constituent received signals for separate subsequent processing. In other embodiments of the present invention, a smaller or a larger number of such received signals may be included in a single multiplexed reception signal that is to be thusly deconstructed.

Centrally, demultiplexer 200 includes an optical transmission block 202 that may be similar in material composition, physical configuration, and method of manufacture to transmission block 102 of multiplexer 100 in FIG. 2. Thus transmission block 202 has on a first side 204 thereof a planar first surface 206 and on an opposed second side 208 thereof a planar second surface 210 that is parallel to first surface 206. As measured between first surface 206 and second surface 210, transmission block 202 has a width $W_{202}$.

Transmission block 202 is rendered internally and externally reflective of optical signals by highly reflective coatings on the faces thereof that may be similar in material composition, physical configuration, and method of manufacture to first coating 112 and second coating 114 of multiplexer 100 in FIG. 2. Accordingly, transmission block 202 of demultiplexer 200 carries a highly reflective first coating 212 on first surface 206 and a highly reflective second coating 214 on second surface 210.

Formed through second coating 214 at selected locations along second surface 210 are a plurality of egress windows at which second surface 210 of transmission block 202 is neither internally nor externally reflective of optical signals. The plurality of egress windows depicted in FIG. 7 includes a first egress window 222, a second egress window 224, a third egress window 226, and a fourth egress window 228. The egress windows of demultiplexer 200 may be similar in material composition, physical configuration, and method of manufacture to the admission windows of multiplexer 100 in FIG. 2. The number of egress windows in a reflective coating, such as second coating 214, will vary with and generally correspond at least to the number of received signals at distinct optical wavelengths that are to be separated from a multiplexed reception signal by a demultiplexer, such as demultiplexer 200. Therefore, a smaller or a greater number of such egress windows may be required in other inventive demultiplexer embodiments.

Figure 7:
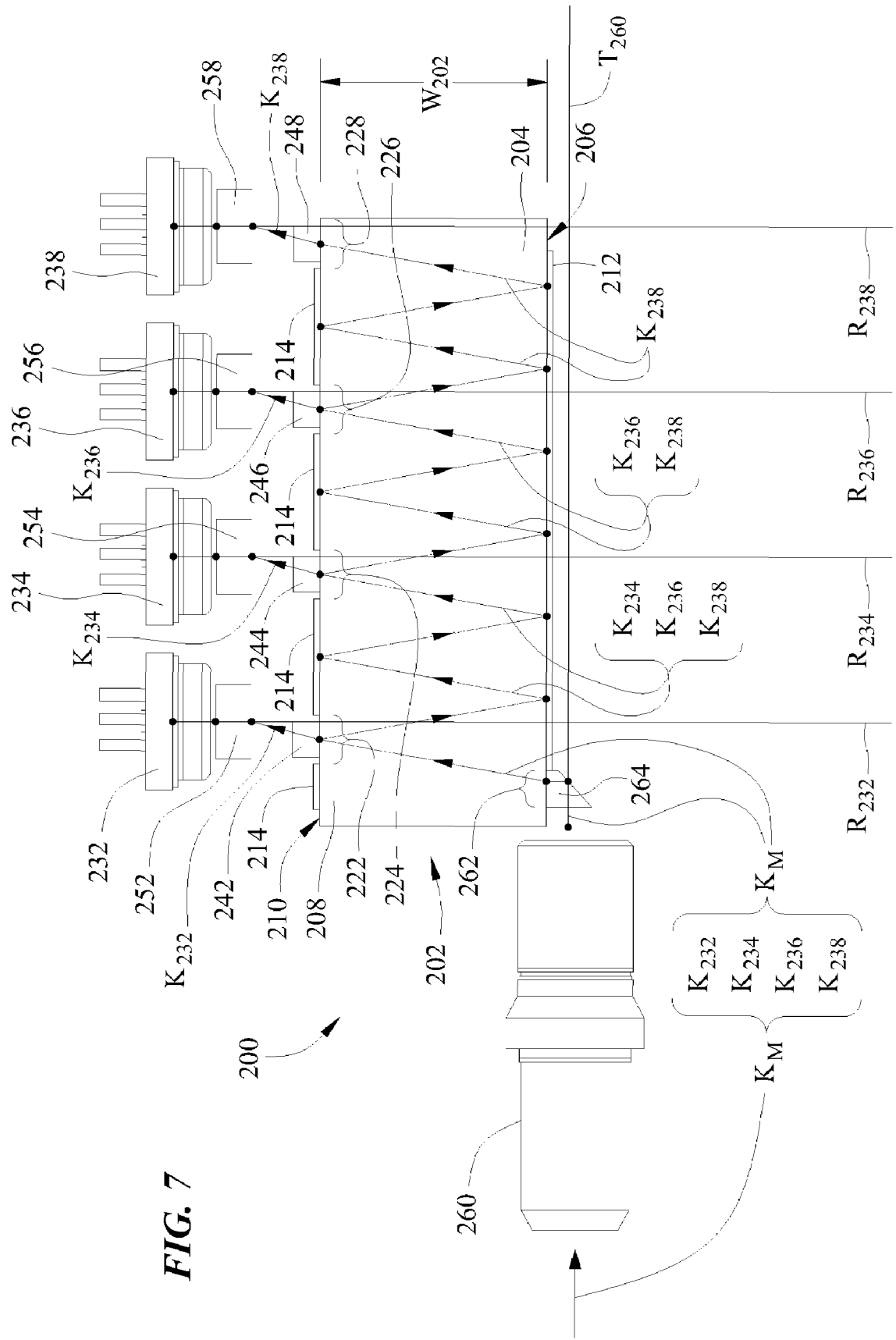
FIG. 7 is a diagram depicting an embodiment of an optical demultiplexer incorporating teachings of the present invention.

Also included in demultiplexer 200 is a plurality of optical detectors that are positioned on the same side of transmission block 202, in the case illustrated in FIG. 7 on second side 208. Each of the detectors is tuned to recognize and to retransmitting received signals at a respective individual reception wavelength, wherefore a smaller or a larger number of detectors may be employed in other embodiments of the invention, depending on the number of received signals to be separated out of a single multiplexed reception signal. The reception axis of each of the detectors is desirable oriented at and substantially normal to second surface 210 of transmission block 202.

The plurality of detectors shown in the embodiment of FIG. 7 includes a first detector 232, a second detector 234, a third detector 236, and a fourth detector 238. First detector 232 recognizes received signals $K_{232}$ at a first reception wavelength $\lambda_{232}$ and has a reception axis $R_{232}$ that is oriented at and substantially normal to second surface 210 of transmission block 202. Second detector 234 recognizes received signals $K_{234}$ at a second reception wavelength $\lambda_{234}$ and has a reception axis $R_{234}$ that is also oriented at and substantially normal to second surface 210. Third detector 236 recognizes received signals $K_{126}$ at a third reception wavelength $\lambda_{236}$ and has a reception axis $R_{236}$ that is oriented at and substantially normal to second surface 210. Finally, fourth detector 238 recognizes received signals $K_{238}$ at a fourth reception wavelength $\lambda_{238}$ and has a reception axis $R_{238}$ that is in addition oriented at and substantially normal to second surface 210 of transmission block 202. Appropriate detectors for use in demultiplexer 200 include PIN detectors and ADP detectors.

Each of the detectors shown in FIG. 7 is associated with a corresponding one of the egress windows formed in second coating 214 on second surface 210 of transmission block 202. Thus, first egress window 222 is associated with first detector 232, second egress window 224 is associated with second detector 234, third egress window 226 is associated with third detector 236, and finally, fourth egress window 228 is associated with fourth detector 238.

Located between each detector of demultiplexer 200 and the egress window associated therewith are a pair of additional associated structures.

The first of these additional associated structures is an optical filter that is positioned on second surface 210 of transmission block 202 filling the associated egress window. Each such optical filter operates at the reception wavelength of the associated detector, thereby blocking from entry into or egress from transmission block 202 through the egress window in which it is located any signal other than received signals at the reception wavelength of the associated detector. From the interior of transmission block 202, these reception filters function as mirrors, reflecting back toward the interior of transmission block 202 any received signals at those other wavelengths that approaches first surface 206 or second surface 210 of transmission block 202 from the interior thereof.

Thus, a first reception filter 242 tuned to first reception wavelength $\lambda_{232}$ is positioned in first egress window 222. First reception filter 242 permits first received signals $K_{232}$ to emerge from transmission block 202 at first egress window 222, but bars passage out of transmission block 202 at first egress window 222 of received signals and components of received signals at any wavelength other than at first reception wavelength $\lambda_{232}$. In addition, first reception filter 242 reflects back toward the interior of transmission block 202 received signals and components of received signals at any wavelength other than at first reception wavelength $\lambda_{232}$.

A second reception filter 244 tuned to second reception wavelength $\lambda_{234}$ is positioned in second egress window 224. Second reception filter 244 permits second received signals $K_{234}$ to emerge from transmission block 202 at second egress window 224, but bars passage out of transmission block 202 at second egress window 224 of received signals and components of received signals at any wavelength other than at second reception wavelength $\lambda_{234}$. In addition, second reception filter 244 reflects back toward the interior of transmission block 202 received signals and components of received signals at any wavelength other than at second reception wavelength $\lambda_{234}$.

A third reception filter 246 tuned to third reception wavelength $\lambda_{236}$ is positioned in third egress window 226. Third reception filter 246 permits third received signals $K_{236}$ to emerge from transmission block 202 at third egress window 226, but bars passage out of transmission block 202 at third egress window 226 of received signals and components of received signals at any wavelength other than at third reception wavelength $\lambda_{236}$. In addition, third reception filter 246 reflects back toward the interior of transmission block 202 received signals and components of received signals at any wavelength other than at third reception wavelength $\lambda_{236}$.

Finally, a fourth reception filter 248 tuned to fourth reception wavelength $\lambda_{238}$ is positioned in fourth egress window 228. Fourth reception filter 248 permits fourth received signals $K_{238}$ to emerge from transmission block 202 at fourth egress window 228, but bars passage out of transmission block 202 at fourth egress window 228 of received signals and components of received signals at any wavelength other than at fourth reception wavelength $\lambda_{238}$. In addition, fourth reception filter 248 reflects back toward the interior of transmission block 202 received signals and components of received signals at any wavelength other than at fourth reception wavelength $\lambda_{238}$.

The second additional associated structure located between each detector of multiplexer 200 and the egress window associated therewith is a lens that is positioned in close proximity to the input side of each detector in alignment with the reception axis thereof. Each lens is capable of reorienting received signals from the reception filter positioned in the associated egress window through an acute angle into alignment with the reception axis of the associated detector and along a redirected reception pathway to detector.

Thus, as seen in FIG. 7, a first lens 252 is associated with first detector 232 and positioned at the input side of first detector 232 between first detector 232 and first reception filter 242 in first egress window 222. A second lens 254 associated with second detector 234 is positioned between the input side of second detector 234 and second reception filter 244 in second egress window 224. Similarly, associated with third detector 236 is a third lens 256 that is positioned between the input side of third detector 236 and third reception filter 246 in third egress window 226. Finally, associated with fourth detector 238 is a fourth lens 248 that is positioned between the input side of fourth detector 238 and fourth reception filter 248 in fourth egress window 228.

Demultiplexer 200 also includes a multiplexed signal receiving port 260 that is disposed on first side 204 of transmission block 202. Multiplexed signal receiving port 260 is positioned to direct a multiplexed reception signal $R_M$ into transmission block 202 at a multiplexed reception signal admission window 262 in second coating 214. Thereupon, multiplexed reception signal $K_M$ is separated into the constituent received signals thereof by being reflected within transmission block 202 between the first coating 112 and second coating 114 toward the detectors of demultiplexer 200.

Demultiplexer 200 further includes a prism 264 positioned between multiplexed reception signal admission window 262 and multiplexed signal receiving port 260. Prism 264 is capable of bending the path of multiplexed reception signal $K_M$ out of optical alignment with the optical transmitting axis $T_{260}$ of multiplexed signal receiving port 260 and into transmission block 202 at multiplexed reception signal admission window 262. Advantageously then, transmitting axis $T_{260}$ of multiplexed signal receiving port 260 can be made to be parallel to first surface 206 of transmission block 202. This harmonizes the functional axis of multiplexed signal receiving port 260 with axes otherwise standard in industry, facilitating easy coupling and replacement of a demultiplexer, such as demultiplexer 200, as a modular component among others in a complex optical system.

A multiplexed reception signal $K_M$ transmitted from multiplexed signal receiving port 260 includes by way of example, first received signal $K_{232}$ at first reception wavelength $\lambda_{232}$, second received signal $K_{234}$ at second reception wavelength $\lambda_{234}$, third received signal $K_{126}$ at third reception wavelength $\lambda_{236}$, and fourth received signal $K_{238}$ at fourth reception wavelength $\lambda_{238}$. The received signals contained in multiplexed reception signal $K_M$ remained optically aligned during repeated internal reflections of multiplexed reception signal $K_M$ within transmission block 202 between first side 204 and second side 208 thereof.

The series of reflections progresses the received signals within transmission block 102 away from multiplexed signal receiving port 260 in a direction parallel to first side 204 and second side 208. As these internal reflections bring the constituents of multiplexed reception signal $K_M$ in turn to each of the reception filters on first side 204 of transmission block 202, the constituent received signal at the optical wavelength passed by that particular reception filter emerges from transmission block 202 and is directed to the associated detector for retransmission. The remaining constituent received signals from multiplexed reception signal $K_M$ continue internal reflections in transmission block 202 away from multiplexed signal receiving port 260. When the next reception filter is reached, another constituent received signal is separated from the group. The process continues until each received signals have been separated from all others.

In achieving this result, first received signal $K_{232}$ engages in the shortest path of travel interior of transmission block 202. First received signal $K_{232}$ enters transmission block 202 at multiplexed reception signal admission window 262 with the other constituent received signals in multiplexed reception signal $K_M$ and makes but a single transit of transmission block 202 to first reception filter 242 in first egress window 222. There, first received signal $K_{232}$ emerges from transmission block 202, as first reception wavelength $\lambda_{232}$ thereof is the optical wavelength that is able to pass through first reception filter 242.

Second received signal $K_{234}$, third received signal $K_{126}$, and fourth received signal $K_{238}$ are, however, reflected back toward first surface 206 of transmission block 202 by first reception filter 242. Following a first reflection at first surface 206, a second reflection at second surface 210, and finally yet a third reflection at first surface 206 again, this group of remaining constituent received signals reach second reception filter 244 in second egress window 224. There second received signal $K_{234}$ emerges from transmission block 202, as second reception wavelength $\lambda_{234}$ thereof is the optical wavelength that is able to pass through second reception filter 244.

Third received signal $K_{126}$, and fourth received signal $K_{238}$ are, however, reflected back toward first surface 206 of transmission block 202 by second reception filter 244. Following a first reflection at first surface 206, a second reflection at second surface 210, and finally yet a third reflection at first surface 206 again, this group of remaining constituent received signals reach third reception filter 246 in third egress window 226. There, third received signal $K_{236}$ emerges from transmission block 202, as third reception wavelength $\lambda_{236}$ thereof is the optical wavelength that is able to pass through third reception filter 246.

Fourth received signal $K_{238}$ is, however, reflected back toward first surface 206 of transmission block 202 by third reception filter 246. Following a first reflection at first surface 206, a second reflection at second surface 210, and finally yet a third reflection at first surface 206 again, this remaining constituent received signal reaches fourth reception filter 248 in fourth egress window 228. There, fourth received signal $K_{238}$ emerges from transmission block 202, as fourth reception wavelength $\lambda_{238}$ thereof is the optical wavelength that is able to pass through fourth reception filter 248.

Figure 8:
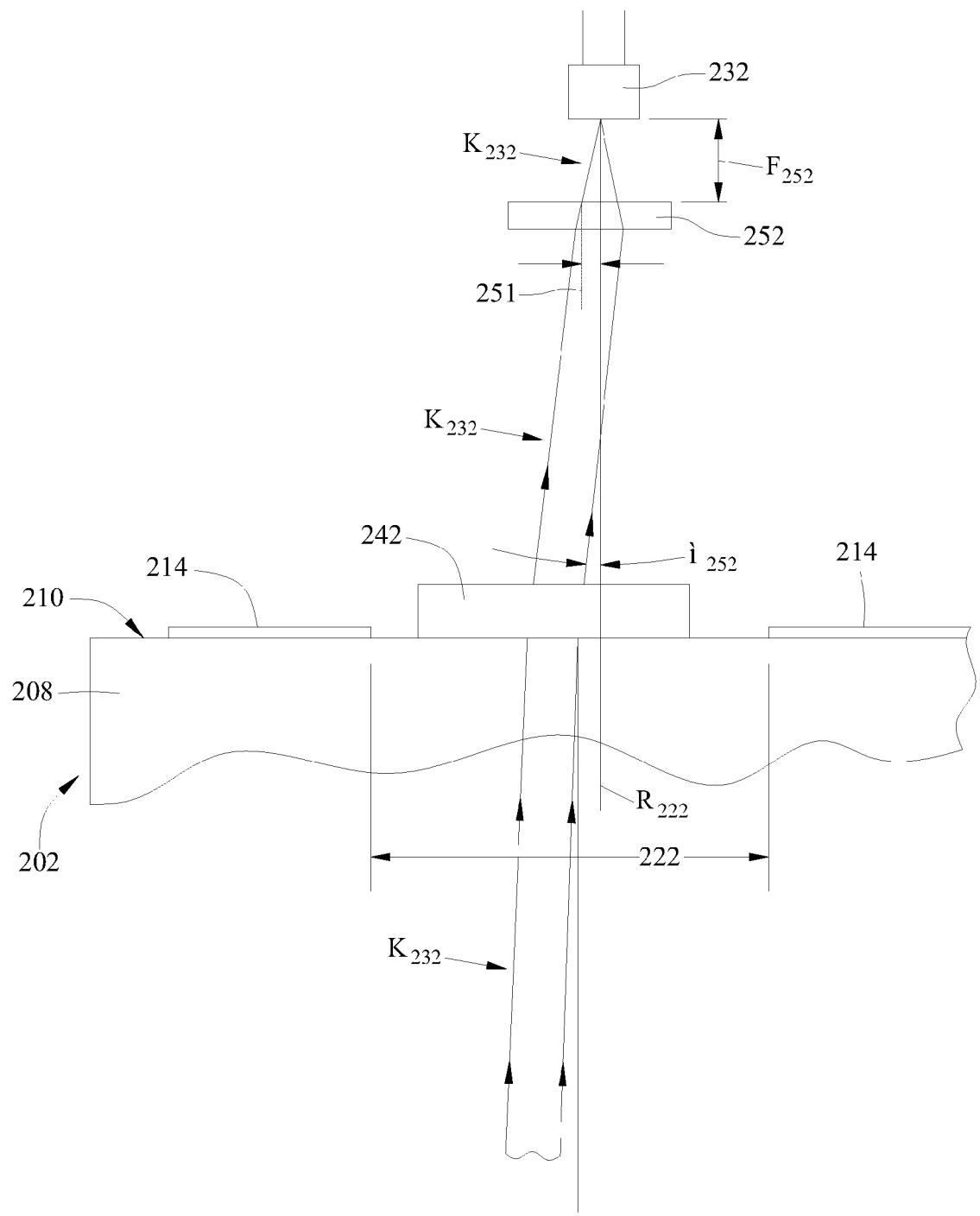
FIG. 8 is an enlarged diagrammatic depiction of an egress window, a reception filter, and a lens associated with each of the optical detectors that is used to acquire individual reception signals produced by the demultiplexer of FIG. 7.
Figure 9:
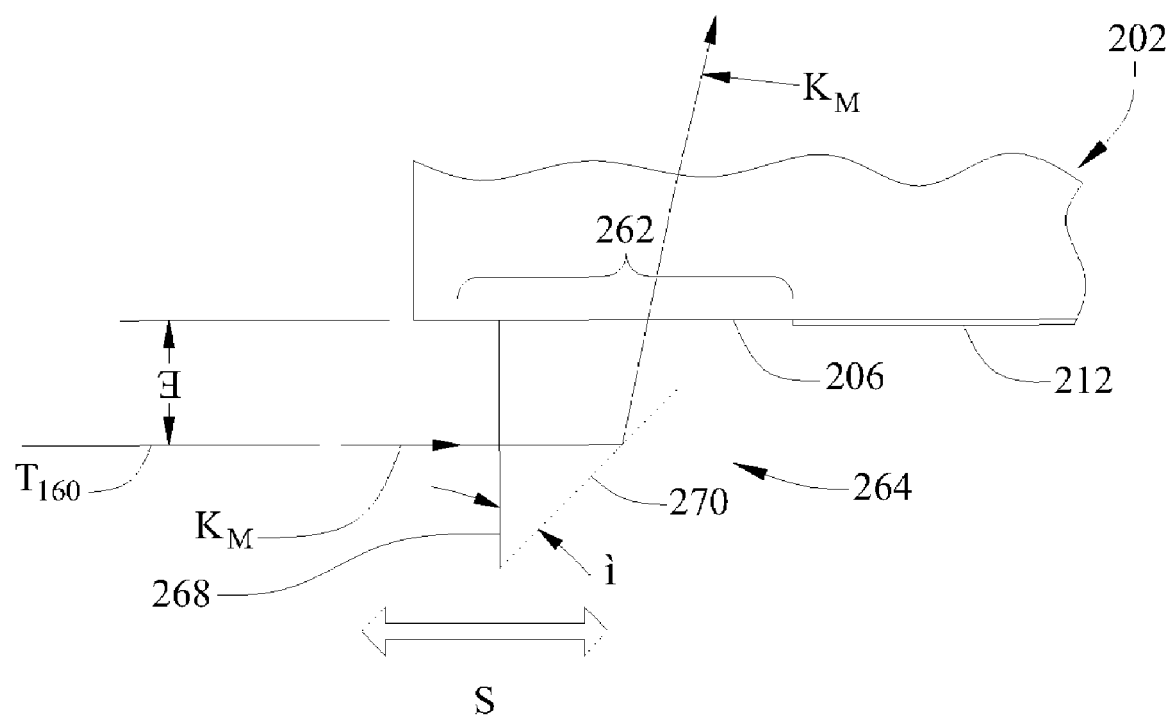
FIG. 9 is an enlarged diagrammatic depiction of a prism that is used to affect the path of the multiplexed reception signal provided as an input to the demultiplexer of FIG. 7.

Selected portions of demultiplexer 200 will be addressed in further detail relative to the enlarged depictions presented in FIGS. 8 and 9.

FIG. 8 is a diagrammatic depiction of a typical detector and the set of lens, reception filter, and egress aperture associated therewith in demultiplexer 200. There, first detector 232 is shown and first egress window 222 that is associated therewith. Between first detector 232 and first egress window 222, the associated first reception filter 242 and first lens 252 also appear. First detector 232 recognizes received signals $K_{232}$ at first reception wavelength $\lambda_{232}$. Received signal $K_{232}$ must, however, be directed to the input side of first detector 232 in alignment with reception axis $R_{232}$ of first reception filter 242.

First lens 252 is optically aligned with reception axis $R_{232}$ of first detector 232 at a focal length $F_{252}$ away from the input side of first detector 232. Focal length $F_{252}$ is determined by the nature of first detector 232 and other performance criteria intended for demultiplexer 200. It is the function of first lens 252 to reorient received signal $K_{232}$ from first reception filter 242 through an acute tilt angle $\mu_{252}$ into alignment with reception axis $R_{232}$ of first detector 232. The distance between first detector's axis $R_{232}$ and first lens' optical axis 251 determines the tilted angle $\mu_{252}$ of beam $K_{232}$. Then received signal $K_{232}$ can enter first detector 232 to be recognized and retransmitted thereby.

Tilt angle $\mu_{252}$ of the beam $K_{232}$ is set equal to the angle of incidence in air for first reception filter 242. Reorienting the pathway for first received signals $K_{232}$ in this manner permits the desirable result of being able to position first detector 232 with reception axis $R_{232}$ oriented at and substantially normal to second surface 210 of transmission block 202. This harmonizes the functional axis of first detector 232 with axes otherwise standard in industry, facilitating easy coupling and replacement of a demultiplexer, such as demultiplexer 200, as a modular component among others in a complex optical system.

FIG. 9 depicts prism 264 attached to first surface 206 of transmission block 202 in demultiplexer 200. Prism 264 may be similar in material composition, physical configuration, method of manufacture, and manner of attachment to prism 164 of multiplexer 100 in FIG. 2. Prism 264 has a longest face 268 that is perpendicular to first surface 206 of transmission block 202 and an inclined face 270 that forms a dihedral incline angle $\delta_{270}$ with longest face 268.

Multiplexed reception signal $K_M$ emerges from multiplexed signal receiving port 260 along transmitting axis $T_{260}$ and enters prism 164 through longest face 268 thereof. Incline angle $\delta_{170}$ is calculated to permit prism 264 to bend the path of multiplexed reception signal $K_M$ out of alignment with transmitting axis $T_{260}$ and into transmission block 202 through the face of prism 164 that is attached thereto. Optimally, incline angle $\delta_{270}$ is so established that transmitting axis $T_{260}$ of multiplexed signal receiving port 260 and the initial path of multiplexed reception signal $K_M$ can be parallel to first surface 206 of transmission block 202. This harmonizes the functional axis of multiplexed signal receiving port 260 with axes otherwise standard in industry, facilitating easy coupling and replacement of a demultiplexer, such as demultiplexer 200, as a modular component among others in a complex optical system. In one embodiment of the inventive technology, it has been found to facilitate this objective if incline angle $\delta_{270}$=49.6±0.1 degrees.

The longitudinal positioning of prism 264 along first surface 206 of transmission block 202 at multiplexed reception signal admission window 262 can be used to determine the separation distance E from first surface 206 of the path along which multiplexed reception signal $K_M$ initially travels to reach prism 264. This in turn is equivalent to determining how far away from first surface 206 it is necessary to position transmitting axis $T_{260}$, and in turn how to dispose multiplexed signal receiving port 260 relative to the other elements of demultiplexer 200. Altering the location of prism 264 in the manner suggested by two-sided arrow S in FIG. 9 will correspondingly vary separation distance E of multiplexed reception signal $K_M$ from first surface 206. Shifting prism 264 in the direction indicated by the left side of arrow S will reduce separation distance E, while shifting prism 264 in the direction indicated by the right side of arrow S will increase separation distance E.

For similar reasoning as that presented relative to the comparison conducted using FIGS. 6A and 6B, the teachings of the present invention enable transmission block 202 of demultiplexer 200 to have a width $W_{202}$ that is substantially reduced in width. The increased number of internal reflections of signals attainable in a transmission block, such as transmission block 202, advantageously enables width $W_{202}$ thereof to be as small as 10 millimeters. Therefrom corresponding economies of size reduction can be attained in all related optical devices and manufacturing methodologies.

According to yet another aspect of the present invention, an optical signal demultiplexer, such as demultiplexer 200, can be made to include multiplexing means cooperative with the transmission block thereof for combining transmitted signals at respective transmission wavelengths into a single multiplexed transmission signal. One embodiment of structures performing the function of a multiplexing means according to teachings of the present invention has been presented in FIG. 2 as a multiplexer 100.

Figure 10:
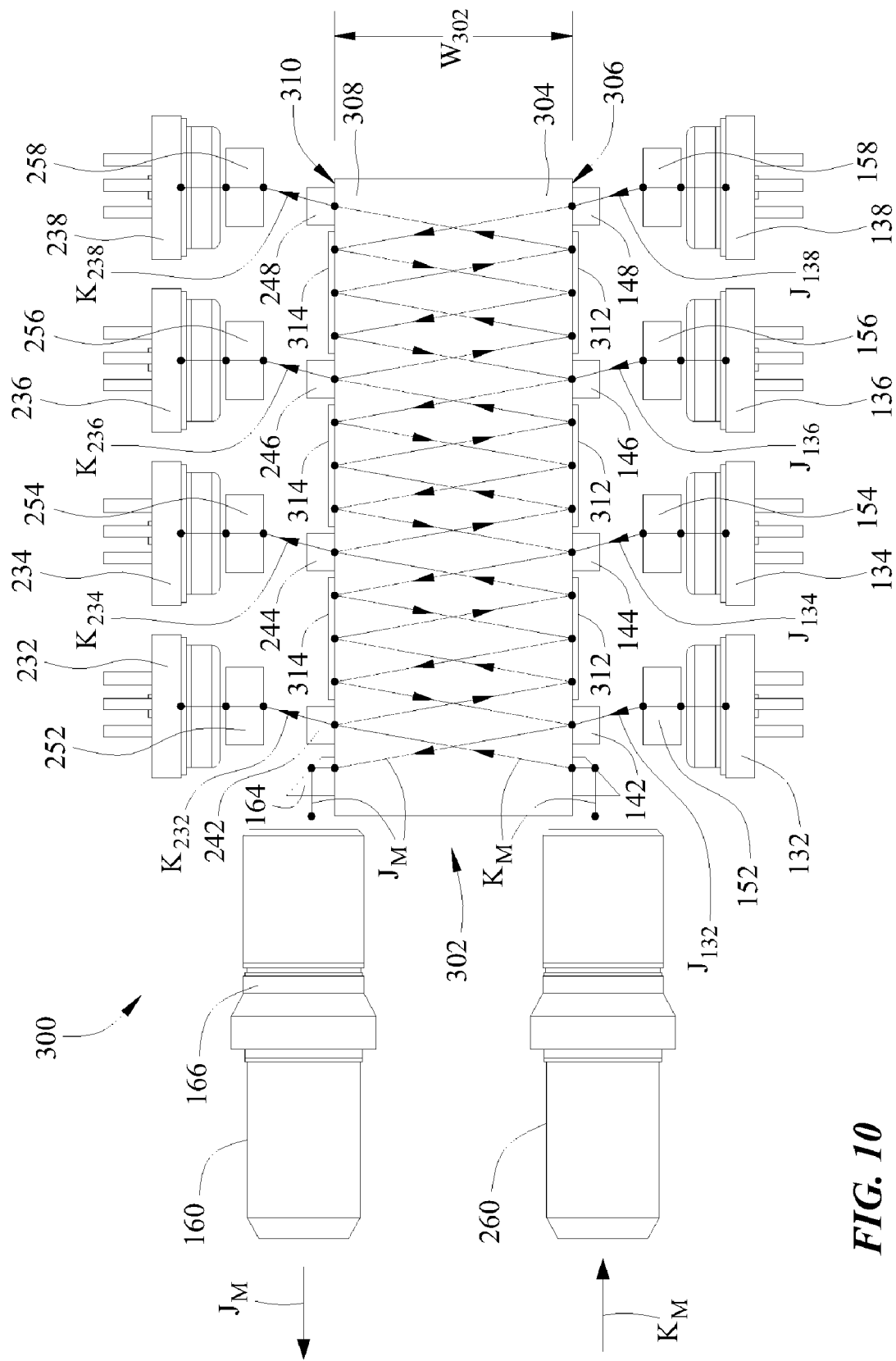
FIG. 10 is a diagram depicting an embodiment of an optical multiplexer-demultiplexer incorporating teachings of the present invention.

A single optical device both the functions of multiplexer 100 of FIG. 2 and the functions of demultiplexer 200 of FIG. 7 is shown by way of completeness in FIG. 10 as a multiplexer-demultiplexer 300. In FIG. 10, any reference character that is identical to a reference character used in FIG. 2 or 7 is intended to identify an element that is structurally and functionally identical among the figures in which that same reference character appears.

Centrally, multiplexer-demultiplexer 300 includes an optical transmission block 302 that may be similar in material composition, physical configuration, and method of manufacture to either or both of transmission block 102 of multiplexer 100 in FIG. 2 or transmission block 202 of demultiplexer 200 in FIG. 7. Thus transmission block 302 has on a first side 304 thereof a planar first surface 306 and on an opposed second side 308 thereof a planar second surface 310 that is parallel to first surface 306. As measured between first surface 306 and second surface 10, transmission block 302 has a width $W_{302}$.

Transmission block 302 carries a highly reflective first coating 312 on first surface 306 and a highly reflective second coating 314 on second surface 310. Formed through first coating 312 at selected locations along first surface 306 are a plurality of admission windows at which first surface 306 of transmission block 302 is neither internally nor externally reflective of optical signals. Formed through second coating 314 at selected locations along second surface 310 are a plurality of egress windows at which second surface 310 of transmission block 302 is neither internally nor externally reflective of optical signals. For simplicity, these admission windows and egress windows are not labeled in FIG. 10.

Multiplexer-demultiplexer 300 is so configured as to be capable, through teachings of the present invention presented relative to multiplexer 100 and demultiplexer 200, of combining four transmitted signals at respective distinct optical transmission wavelengths in to a single multiplexed transmission signal, and of separating a single multiplexed reception signal containing four received signals at respective distinct optical reception wavelengths into those constituent received signals. One or more of the distinct optical transmission wavelengths may be identical to a corresponding one of the distinct optical reception wavelengths. In other embodiments of the present invention, a smaller or a larger number of transmitted signals or received signals may be effectively manipulated by a multiplexer-demultiplexer, such as multiplexer-demultiplexer 300, and the number of transmitted and received may or may not be identical in any given inventive embodiment thereof without departing from the teachings of the present invention.

For similar reasoning as that presented relative to the comparison conducted using FIGS. 6A and 6B, the teachings of the present invention enable transmission block 302 of multiplexer-demultiplexer 300 to have a width $W_{302}$ that is substantially reduced in width. The increased number of internal reflections of signals attainable in a transmission block, such as transmission block 302, advantageously enables width $W_{302}$ thereof to be as small as 10 millimeters.

The present invention also contemplates a method for processing a plurality of optical signals at a corresponding plurality of respective individual wavelengths. That method includes the step of covering opposed parallel first and second planar surfaces on respective first and second sides of an optical signal transmission block with highly reflective first and second coatings. A plurality of lasers capable of producing transmitted signals at distinct transmission wavelengths are positioned on the first side of the transmission block with the transmission axis of each of the lasers oriented at and substantially normal to the first surface of the transmission block. Transmitted signals from the lasers are reorienting into the transmission block through the first surface thereof along parallel paths at an acute tilt angle to the transmission axis of each respective laser. The transmitted signals are then reflected within the transmission block between the first and second coatings in a direction that is parallel to the first and second surfaces and away from the lasers. Following these reflections, the transmitted signals emerge in mutual optical alignment from the second surface of the transmission block as a multiplexed transmission signal, which is received in a signal transmission port on the second side of the transmission block.

The method may also includes the steps of orienting the receiving axis of the transmission port parallel to the second surface of the transmission block, and bending the path of the multiplexed transmission signal into optical alignment with the receiving axis of the transmitting port. Additionally, a plurality of admission windows are formed through the first coating corresponding in one-to-one relation to the plurality of lasers, and signals passing through each of the admission windows are filtered to the transmission wavelength of the transmitted signals produced by the laser corresponding thereto. A multiplex signal egress window is formed in the second coating.

According to another aspect of the present invention, a method as described above also includes the steps of delivering into the transmissions block through the first surface thereof a multiplexed reception signal containing a plurality of received signals at respective reception wavelengths, and positioning a plurality of optical detectors capable of detecting received signals at a respective reception wavelength on the second side of the transmission block with the receiving axis of each of the detectors oriented at and substantially normal to the second surface of the transmission block. The received signals delivered into the transmission block are reflecting within the transmission block between the first and second coatings in a direction that is parallel to the first and second surfaces and toward the detectors. Following these reflections, the received signals emerge from the second surface of the transmission block and are reoriented into alignment with the receiving axis of each of the detectors.

The step of delivering comprises the steps of positioning a multiplexed signal receiving port on the first side of the transmission block with the transmission axis of the receiving port oriented parallel to the first surface of the transmission block, transmitting the multiplexed reception signal from the receiving port, and bending the path of the multiplexed transmission signal from the transmission axis of the receiving port into a non-perpendicular angle of incidence with the first surface of the transmission block.

The method also involves the steps of forming a plurality of egress windows through the second coating corresponding in one-to-one relation to the plurality of detectors, and forming a multiplex signal access window in the first coating. Each of the detectors is tuned to the reception wavelength corresponding thereto, and the step of doing so includes the step of filtering to a respective individual reception wavelength received signals emerging from the transmission block at each egress window.

The foregoing description of the invention has been described for purposes of clarity and understanding. It is not intended to limit the invention to the precise form disclosed. Various modifications may be possible within the scope and equivalence of the appended claims.

What is claimed is:

1. An optical multiplexing and demultiplexing apparatus comprising:

(a) an optical signal transmission block having on opposite first and second sides thereof corresponding parallel planar first and second surfaces substantially covered by respective highly reflective first and second coatings;

(b) a first signal source comprising:
   (i) a first laser capable of producing transmitted signals at a first transmission wavelength, the first laser being positioned on the first side of the transmission block with the transmission axis of the first laser oriented at and substantially normal to the first surface of the transmission block; and
   (ii) a first lens associated with the first laser, the first lens reorienting transmitted signals an acute tilt angle from the first laser through shifting a distance between an optical axis of the first lens and the transmission axis of the first laser along a redirected transmission pathway to a corresponding first admission window in the first coating;

(c) a second signal source comprising:
   (i) a second laser capable of producing transmitted signals at a second transmission wavelength, the second laser being positioned on the first side of the transmission block separated along the first surface of the transmission block from the first laser with the transmission axis of the second laser oriented at and substantially normal there the first surface of the transmission block; and
   (ii) a second lens associated with the second laser, the second lens reorienting transmitted signals an acute tilt angle from the second laser through shifting a distance between optical axis of the second lens and the optical axis of the second laser along a redirected transmission pathway parallel to the redirected transmission pathway of the transmitted signals from the second laser to a corresponding second admission window in the first coating;

(d) a multiplexed signal transmitting port on the second side of the transmission block, the transmitting port being positioned to receive transmitted signals from the first and second lenses emerging in mutual optical alignment as a multiplexed transmission signal from a multiplexed signal egress window in the second coating following reflections of the transmitted signals from the first and second lenses within the transmission block between the first and second coatings; and (e) a demultiplexer cooperative with the transmission block for separating a multiplexed reception signal into constituent received signals at respective first and the second reception wavelengths.

2. An apparatus as recited in claim 1, wherein:
(a) the receiving axis of the transmitting port is parallel to the second surface of the transmission block; and
(b) the apparatus further comprises a prism positioned between the multiplexed signal egress window and the transmission port, the prism being capable of bending the path of the multiplexed transmission signal into optical alignment with the receiving axis of the transmitting port.

3. An apparatus as recited in claim 1, further comprising:
(a) a first transmission filter at the first admission window, the first transmission filter being operative at the first transmission wavelength to exclude from the transmission block signals other than transmitted signals at the first transmission wavelength; and
(b) a second transmission filter at the second admission window, the second transmission filter being operative at the second transmission wavelength to exclude from the transmission block signals other than transmitted signals at the second transmission wavelength.

4. An apparatus as recited in claim 1, wherein the demultiplexer comprises:
   (a) a multiplexed signal receiving port on the first side of the transmission block positioned to deliver the multiplexed reception signal into the transmission block through a multiplexed signal admission window in the first coating; and
   (b) a plurality of optical detectors positioned on the second side of the transmission block with the optical receiving axis of each of the detectors being oriented at and substantially normal to the second surface of the transmission block, each of the detectors being tuned to a respective of the first and second reception wavelengths of the received signals, and each of the detectors having associated therewith:
      (i) an egress window in the second coating; and
      (ii) a lens capable of reorienting received signals emerging from the transmission block at the egress window through a shift distance between the optical receiving axis of a third lens and the receiving axis of the associated detector.

5. An apparatus as recited in claim 4, wherein:
   (a) the transmitting axis of the receiving port is parallel to the first surface of the transmission block; and
   (b) the demultiplexer further comprises a prism positioned between the multiplexed signal admission window and the receiving port, the prism being capable of bending the path of the multiplexed reception signal out of alignment with the transmitting axis of the receiving port toward the a multiplexed signal admission window.

6. An apparatus as recited in claim 4, wherein the detectors are selected from the group of detectors comprising PIN detectors and APD detectors.

7. An apparatus as recited in claim 1, wherein the first and second coatings comprise tantalum oxide ($Ta_2O_5$).

8. An apparatus as recited in claim 1, wherein the first and second coatings comprise silicon oxide ($SiO_5$).

9. An apparatus as recited in claim 1, wherein the first and second lasers are selected from the group of lasers consisting of FP lasers, DFB lasers, and VCSEL lasers.

10. An optical multiplexing and demultiplexing apparatus comprising:
    (a) an optical signal transmission block having on opposite first and second sides thereof parallel planar first and second surfaces;
    (b) highly reflective first and second coatings substantially covering the first and second surfaces, respectively;
    (c) a plurality of lasers positioned on the first side of the transmission block with the transmission axis of each of the lasers being oriented at and substantially normal to the first surface of the transmission block, each of the lasers producing transmitted signals at a respective individual transmission wavelength, and each of the lasers having associated therewith:
       (i) an admission window in the first coating; and
       (ii) a lens capable of reorienting transmitted signals an acute tilt angle from the associated laser through shifting a distance between the optical axis of lens and the transmission axis of the associated laser along a redirected transmission pathway to the associated admission window;
    (d) a multiplexed signal transmitting port on the second side of the transmission block positioned to receive transmitted signals from the plurality of lasers, the transmitted signals emerging in mutual optical alignment as a multiplexed transmission signal from the transmission block at a multiplexed signal egress window in the second coating following reflections of the transmitted signals toward the transmitting port within the transmission block between the first and second coatings; and
    (e) a demultiplexer cooperating with the transmission block for separating a multiplexed reception signal into constituent detected signals at respective reception wavelengths.

11. An apparatus as recited in claim 10, wherein:
    (a) the receiving axis of the transmitting port is parallel to the second surface of the transmission block; and
    (b) the apparatus further comprises a prism positioned between the multiplexed signal egress window and the transmission port, the prism being capable of bending the path of the multiplexed transmission signal into alignment with the receiving axis of the transmitting port.

12. An apparatus as recited in claim 10, wherein the demultiplexer comprises:
    (a) a multiplexed signal receiving port on the first side of the transmission block positioned to deliver a multiplexed reception signal containing a plurality of received signals at respective optical wavelengths into the transmission block through a multiplexed signal admission window in the first coating; and
    (b) a plurality of optical detectors positioned on the second side of the transmission block with the receiving axis of each of the detectors being oriented at and substantially normal to the second surface of the transmission block, each of the detectors being tuned to a respective of the reception wavelengths of the received signals, and each of the detectors having associated therewith:
       (i) an egress window in the second coating; and
       (ii) a lens capable of reorienting received signals emerging from the transmission block at the corresponding egress window through shifting a distance between the optical axis of the lens and the receiving axis of the associated detector.

13. An apparatus as recited in claim 12, wherein:
    (a) the transmitting axis of the receiving port is parallel to the first surface of the transmission block; and
    (b) the apparatus further comprises a prism positioned between the multiplexed signal admission window and the receiving port, the prism being capable of bending the path of the multiplexed reception signal out of alignment with the transmitting axis of the receiving port toward the multiplexed signal admission window.

14. An apparatus as recited in claim 13, wherein the prism comprises fused silica.

15. An apparatus as recited in claim 13, wherein the angle of the prism is about 46.9 degrees.

16. An apparatus as recited in claim 13, wherein the prism engages the first surface of the transmission block.

17. An apparatus as recited in claim 16, wherein the prism is bonded to the first surface of the transmission block using an epoxy adhesive having an optical index approximately to the optical index of fused silica.

18. An apparatus as recited in claim 12, wherein further associated with each of the detectors is a reception filter operating at the reception wavelength of the associated detector, the reception filter blocking from the associated detector signals other than received signals at the reception wavelength of the associated detector.

19. An apparatus as recited in claim 10, wherein further associated with each of the lasers is a transmission filter operating at the transmission wavelength of the associated laser, the transmission filter blocking from the transmission block signals other than transmitted signals at the transmission wavelength of the associated laser.

20. An optical multiplexing and demultiplexing apparatus comprising:
(a) an optical signal transmission block having on opposite first and second sides thereof corresponding parallel planar first and second surfaces substantially covered by highly reflective first and second coatings, respectively;
(b) a multiplexed signal receiving port on the first side of the transmission block positioned to deliver multiplexed reception signals containing received signals at respective first and second reception wavelengths into the transmission block through a multiplexed signal admission window in the first coating;
(c) a first signal receiver comprising:
  (i) an optical first detector positioned on the second side of the transmission block with the receiving axis of the first detector being oriented at and substantially normal to the second surface of the transmission window; and
  (ii) a first reception filter at a first egress window in the second coating, the first reception filter being operative at the first reception wavelength to exclude from the first detector signals other than received signals at the first reception wavelength emerging from the transmission block through the first egress window following reflections of the multiplexed reception signals within the transmission block between the first and second coatings;
(d) a second signal receiver comprising:
  (i) an optical second detector positioned on the second side of the transmission block with the receiving axis of the second detector being oriented at and substantially normal to the second surface of the transmission block; and
  (ii) a second reception filter at a second egress window in the second coating, the second reception filter being operative at the second reception wavelength to exclude from the second detector signals other than received signals at the second reception wavelength emerging from the second surface of the transmission block through the second egress window following reflections of the multiplexed reception signals within the transmission block between the first and second coatings; and
(e) a multiplexer cooperative with the transmission block for combining transmitted signals at respective first and second transmission wavelengths into a multiplexed transmission signal.

21. An apparatus as recited in claim 20, wherein:
(a) the transmitting axis of the receiving port is parallel to the first surface of the transmission block; and
(b) the apparatus further comprises a prism positioned between the multiplexed signal admission window and the receiving port, the prism being capable of bending the path of the multiplexed reception signal out of alignment with the transmitting axis of the receiving port toward the multiplexed signal admission window.

22. An apparatus as recited in claim 20, further comprising:
(a) a first lens positioned to reorient received signals from the first reception filter through shifting a distance between the first lens and the receiving axis of the first detector; and
(b) a second lens positioned to reorient received signals from the second reception filter through shifting a distance between the second lens and the receiving axis of the second detector.

23. An apparatus as recited in claim 22, wherein the first and second lenses are selected from the group of lenses comprising A-lenses, D-lenses, Grin-lenses, and Ball-lenses.

24. An apparatus as recited in claim 22, wherein the first and second lenses reorient received signals from the first and second reception filters, respectively, through a tilt angle of approximately 13.5 degrees.

25. An apparatus as recited in claim 20, wherein the multiplexer comprises:
(a) first and second lasers positioned on the first side of the transmission block with the optical transmission axis of each of the lasers being oriented at and substantially normal to the first surface of the transmission block, the first and second lasers producing transmitted signals at the first and second transmission wavelengths, respectively, and each of the lasers having associated therewith:
  (i) an admission window in the first coating; and
  (ii) a lens capable of reorienting transmitted signals from the associated laser into the transmission block by redirecting the transmitted signals through an acute tilt angle away from the transmission axis of the associated laser along a redirected transmission pathway to the associated admission window;
(b) a multiplexed signal transmitting port on the second side of the transmission block positioned to receive transmitted signals from the plurality of lasers, the transmitted signals emerging in mutual optical alignment as a multiplexed transmission signal from the second surface of the transmission block through a multiplexed signal egress window in the second coating following reflections of the transmitted signals toward the transmitting port within the transmission block between the first and second coatings.

26. An apparatus as recited in claim 25, wherein:
(a) the receiving axis of the transmitting port is parallel to the second surface of the transmission block; and
(b) the apparatus further comprises a prism positioned between the multiplexed signal egress window and the transmission port, the prism being capable of bending the path of the multiplexed transmission signal into optical alignment with the receiving axis of the transmitting port.

27. An apparatus as recited in claim 26, wherein the prism comprises fused silica.

28. An apparatus as recited in claim 26, wherein the angle of the prism is about 46.9 degrees.

29. An apparatus as recited in claim 26, wherein the prism engages the second surface of the transmission block.

30. An apparatus as recited in claim 29, wherein the prism is bonded to the second surface of the transmission block using an epoxy adhesive having an optical index approximately to the optical index of fused silica.

31. An apparatus as recited in claim 25, wherein the lens is selected from the group of lenses comprising A-lenses, D-lenses, Grin-lenses, and Ball-lenses.

32. An apparatus as recited in claim 25, wherein the lens redirects the transmitted signals through a tilt angle of approximately 13.5 degrees.

33. An apparatus as recited in claim 20, wherein the transmission block comprises fused silica.

34. An apparatus as recited in claim 20, wherein the width of the transmission block measured between the first and second surfaces thereof if approximately 10.0 millimeters.

35. A method for processing a plurality of optical signals at a corresponding plurality of respective individual wavelengths, the method comprising the steps of:
 (a) covering opposed parallel first and second planar surfaces on respective first and second sides of an optical signal transmission block with highly reflective first and second coatings;
 (b) positioning a plurality of lasers on the first side of the transmission block with the transmission axis of each of the lasers oriented at and substantially normal to the first surface of the transmission block, each of the lasers being capable of producing transmitted signals at a distinct transmission wavelength;
 (c) reorienting the transmitted signals into the transmission block through the first surface thereof along parallel paths at an acute tilt angle to the transmission axis of each respective laser;
 (d) reflecting within the transmission block between the first and second coatings the transmitted signals reoriented into the transmission block through the first surface thereof, and
 (e) receiving in a signal transmission port on the second side of the transmission block the transmitted signals emerging in mutual optical alignment as a multiplexed transmission signal from the second surface of the transmission block following reflections of the transmitted signals within the transmission block between the first and second coatings.

36. A method as recited in claim 35, further comprising the steps of:
 (a) orienting the receiving axis of the transmission port parallel to the second surface of the transmission block; and
 (b) bending the path of the multiplexed transmission signal into optical alignment with the receiving axis of the transmitting port.

37. A method as recited in claim 35, further comprising the steps of:
 (a) forming through the first coating a plurality of admission windows corresponding in one-to-one relation to the plurality of lasers;
 (b) filtering signals passing through each of the admission windows to the transmission wavelength of the transmitted signals produced by the laser corresponding thereto; and
 (c) forming a multiplex signal egress window in the second coating.

38. A method as recited in claim 35, further comprising the steps of:
 (a) delivering into the transmissions block through the first surface thereof a multiplexed reception signal containing a plurality of received signals at respective reception wavelengths;
 (b) positioning a plurality of optical detectors on the second side of the transmission block with the receiving axis of each of the detectors being oriented at and substantially normal to the second surface of the transmission block, each of the detectors being capable of detecting received signals at a respective reception wavelength;
 (c) reflecting within the transmission block between the first and second coatings received signals delivered into the transmission block through the first surface thereof, and
 (d) reorienting into alignment with the receiving axis of each of the detectors received signals at the respective reception wavelength corresponding thereto, the received signals emerging from the second surface of the transmission block following reflecting within the transmission block between the first and second coatings.

39. A method as recited in claim 38, further comprising the steps of:
 (a) forming through the second coating a plurality of egress windows corresponding in one-to-one relation to the plurality of detectors; and
 (b) forming a multiplex signal access window in the first coating.

40. A method as recited in claim 38, further comprising the step of tuning each of the detectors to the reception wavelength corresponding thereto.

41. A method as recited in claim 40 wherein the step of tuning comprises the step of filtering to a respective individual reception wavelength received signals emerging from the transmission block at each egress window.

42. A method as recited in claim 38, wherein the step of delivering comprises the steps of:
 (a) positioning a multiplexed signal receiving port on the first side of the transmission block with the transmission axis of the receiving port oriented parallel to the first surface of the transmission block;
 (b) transmitting the multiplexed reception signal from the receiving port; and
 (c) bending the path of the multiplexed transmission signal from the transmission axis of the receiving port into a non-perpendicular angle of incidence with the first surface of the transmission block.

* * * * *